US006754184B2

(12) United States Patent
Miyano et al.

(10) Patent No.: US 6,754,184 B2
(45) Date of Patent: Jun. 22, 2004

(54) INFORMATION PROCESSING APPARATUS AND METHOD, AND DISTRIBUTION MEDIUM

(75) Inventors: Michio Miyano, Kanagawa (JP); Junji Kato, Tokyo (JP); Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/339,555

(22) Filed: Jun. 24, 1999

(65) Prior Publication Data

US 2003/0202509 A1 Oct. 30, 2003

(30) Foreign Application Priority Data

Jun. 26, 1998 (JP) ........................................... 10-180019

(51) Int. Cl.[7] .............................................. H04L 12/28
(52) U.S. Cl. ..................................................... 370/257
(58) Field of Search ................................ 370/257, 201, 370/216, 222, 242, 912, 256, 255, 237; 375/219–222, 298, 340–355, 225; 710/22–23, 100–104; 712/223–225, 248, 245; 256/716; 468/222, 242, 914

(56) References Cited

U.S. PATENT DOCUMENTS

| | | | | |
|---|---|---|---|---|
| 5,596,712 A | * | 1/1997 | Tsuyama et al. | 714/26 |
| 5,649,193 A | * | 7/1997 | Sumita et al. | 707/103 |
| 5,687,319 A | * | 11/1997 | Cook et al. | 370/256 |
| 5,761,637 A | * | 6/1998 | Chino | 704/231 |
| 5,812,594 A | * | 9/1998 | Rakib | 375/219 |
| 5,883,621 A | * | 3/1999 | Iwamura | 345/327 |
| 5,970,496 A | * | 10/1999 | Katzenberger | 707/102 |
| 6,006,286 A | * | 12/1999 | Baker et al. | 710/22 |
| 6,112,024 A | * | 8/2000 | Almond et al. | 707/203 |
| 6,141,767 A | * | 10/2000 | Hu et al. | 714/1 |
| 6,157,972 A | * | 12/2000 | Newman et al. | 710/100 |
| 6,160,796 A | * | 12/2000 | Zou | 370/257 |
| 6,212,171 B1 | * | 4/2001 | LaFollette et al. | 370/257 |
| 6,411,628 B1 | * | 6/2002 | Hauck et al. | 370/447 |

* cited by examiner

Primary Examiner—Chi Pham
Assistant Examiner—Prenell Jones
(74) Attorney, Agent, or Firm—Frommer Lawrence & Haug LLP; William S. Frommer

(57) ABSTRACT

An information processing apparatus having unique information connected to a network together with a plurality of other information processing apparatuses each connected to the network and each having unique information is provided. The apparatus receives unique information for identifying all of the information processing apparatuses on the network, and obtains a network structure of the network based upon the unique information of all of the information processing apparatuses. The apparatus counts a number of connections between all of the information processing apparatuses on the network based upon the network structure, and controls the communication timing of the information apparatuses on the network based upon the number of connections. The apparatus obtains a topology map of the network based upon the unique information of each of the information processing apparatuses. The apparatus stores the topology map, stores the appropriate timings corresponding to number of the connections, and controls the communication timing.

24 Claims, 28 Drawing Sheets

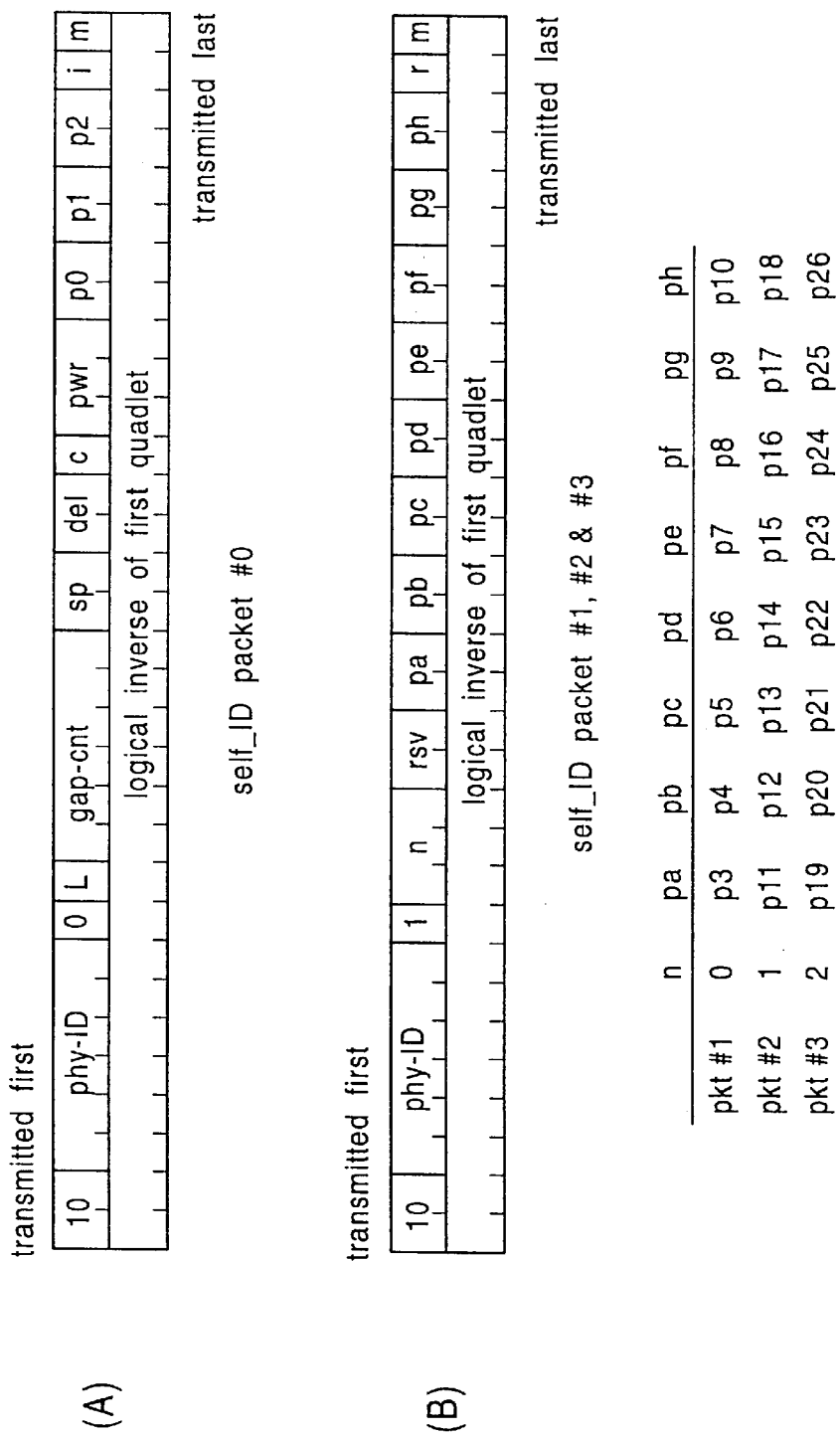

FIG. 5

| FIELD | NAME | CONTENTS |
|---|---|---|
| phy_ID | physical_ID | PHYSICAL ID OF NODE WHICH SENT PACKET |
| L | link active | INDICATES THAT LINK LAYER IS OPERATING |
| gap cnt | gap_count | INDICATES CURRENT GAP SETTING OF THIS NODE |
| sp | PHY_speed | INDICATES TRANSFER SPEED PERFORMANCE |
| del | PHY_del | AMOUNT OF DELAY AS REPEATER |
| c | contender | SET WHEN SETTING AS BUS MANAGER OR ISOCHRONOUS RESOURCE MANAGER IS DESIRED |
| pwr | power_class | INDICATES POWER CONSUMPTION AND SUPPLY PERFORMANCE |
| p0,p1,p2---p26 | NPort | INDICATES THE STATUS OF PORT |
| i | initiated_reset | THIS NODE HAS INITIATED BUS RESET |
| m | more_packets | FOLLOWED BY PACKETS FOR THIS NODE |

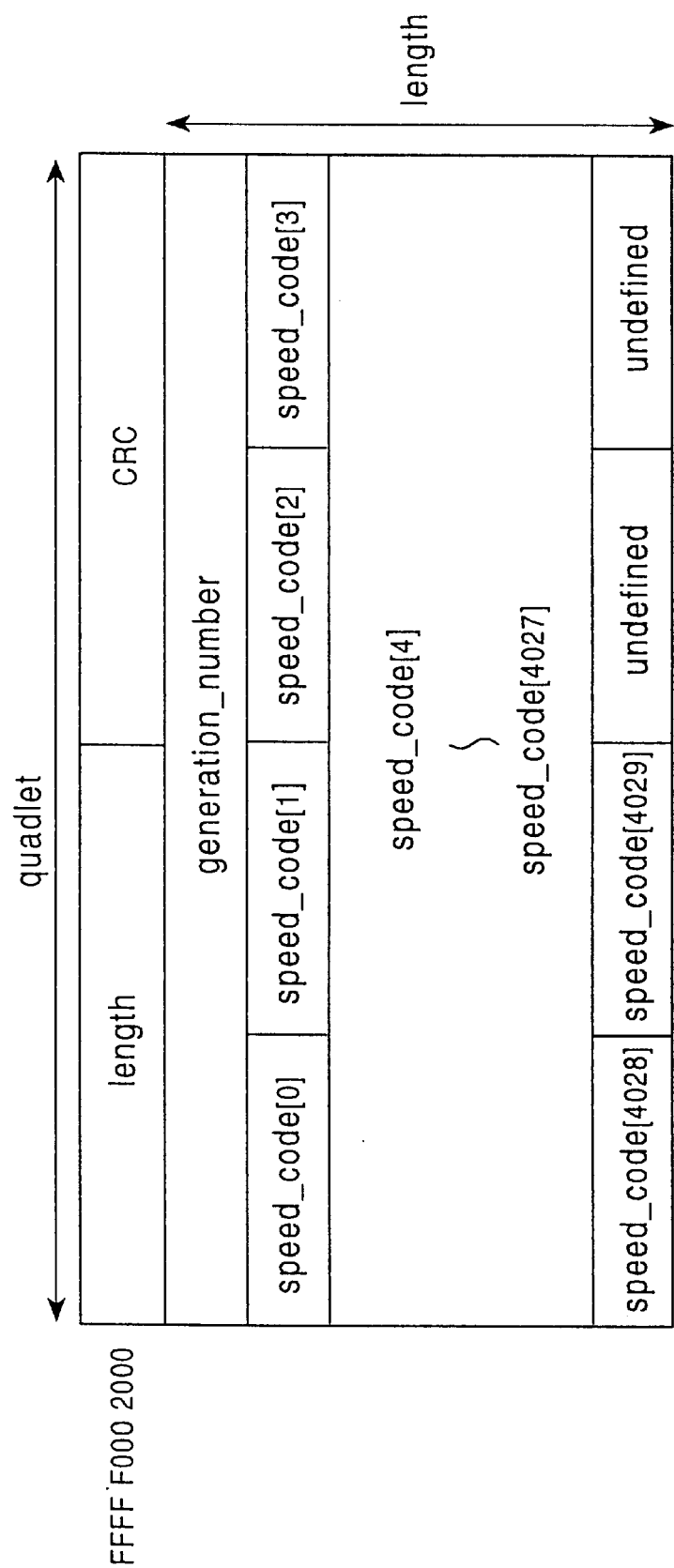

FIG. 10

| PHYSICAL ID | 0 | 1 | 2 | 3 | 4 | 5 |
|---|---|---|---|---|---|---|
| NUMBER OF CHILDREN | 0 | 0 | 0 | 2 | 1 | 2 |

FIG. 27

| TYPE OF GAP | MINIMUM VALUE | MAXIMUM VALUE | |
|---|---|---|---|
| ACKNOWLEDGE GAP, ISOCHRONOUS GAP | 0.04μs | 0.05μs | |
| SUBACTION GAP | (24+gap_cnt≠16) / 100μs | (29+gap_cnt≠16) / 100μs | INITIAL VALUE OF gap_cnt IS 63, THEREFORE, APPROXIMATELY 10μs |
| ARBITRATION RESET GAP | (51+gap_cnt≠32) / 100μs | (53+gap_cnt≠32) / 100μs | INITIAL VALUE IS APPROXIMATELY 20μs |

INFORMATION PROCESSING APPARATUS AND METHOD, AND DISTRIBUTION MEDIUM

BACKGROUND OF THE INVENTION

The present invention relates to an information processing apparatus and method, and to a distribution medium. More particularly, the present invention relates to an information processing apparatus and method which realizes communication at the optimum communication speed of a network, and to a distribution medium.

When data is transmitted among arbitrary information processing apparatuses (hereinafter referred to as "apparatuses") connected to a bus, which are capable of transmitting data at a plurality of transmission rates, it is necessary to select a data transmission rate at which a transmitting apparatus can transmit, a receiving apparatus can receive, and further, at which, when there is another apparatus (relay apparatus) among the apparatuses, at which the relay apparatus can also operate. FIG. 21 shows an example of a plurality of apparatuses connected to an IEEE1394 serial bus. An IRD (Integrated Receiver/Decoder) 1 to which an antenna 7, a monitor 2, an MD (Mini Disk) deck 3, and digital VTRs (Video Tape Recorders) 4 to 6 are connected to each other by IEEE1394 serial buses 8-1 to 8-5. These apparatuses, which fulfill the specifications for IEEE1394 and IEC61883 which defines AV (Audio Visual) data transmission on the IEEE1394, constitute nodes which are units to which access can be made in the IEEE1394, and have a data transmission rate at which data can be transmitted from one to the other or be received from one to the other.

The IEEE1394 serial bus is defined as the specifications of a digital interface for connecting a plurality of apparatuses. As specifications for defining the transmission rate among apparatuses connected to the IEEE1394 serial bus, three types are defined: S100 having a data transmission rate of 98.308 Mbps, S200 having a data transmission rate of 196.608 Mbps, and S400 having a data transmission rate of 392.216 Mbps. An apparatus having a high-speed data transmission rate can transmit data at a data transmission rate slower than this. For example, an apparatus which supports S400 also supports the data transmission of S200 and S100. The data transmission of S100 is possible by all apparatuses which fulfill the specifications for IEEE1394. When these apparatuses, whose upper limits of the data transmission rate are different, are connected to the IEEE1394 serial bus, the apparatus which performs data transmission must transmit data at a transfer rate at which an apparatus which performs relay can perform a relay process.

FIG. 22 shows an example of a connection of apparatuses, in which physical IDs (Identification Data) of the apparatuses shown in FIG. 21 and the specifications of the data transmission rates are indicated within the nodes. The apparatus which is connected to the IEEE1394 serial bus forms a node on the IEEE1394. A node 11 fulfilling the specifications for the data transmission rate of S400 of FIG. 22 corresponds to an IRD 1 of FIG. 21. In a similar manner, a node 12 fulfilling the specifications for the data transmission rate of S200 corresponds to the monitor 2, a node 13 fulfilling the specifications for the data transmission rate of S200 corresponds to the MD deck 3, a node 14 fulfilling the specifications for the data transmission rate of S100 corresponds to the digital VTR 4, a node 15 fulfilling the specifications for the data transmission rate of S100 corresponds to the digital VTR 5, and a node 16 fulfilling the specifications for the data transmission rate of S200 corresponds to the digital VTR 6. For example, the IRD 1 fulfills the specifications for S400, the monitor 2 fulfills the specifications for S200, and there is no apparatus which relays data in between, thereby making possible communication at a data transmission rate of 196.608 Mbps. Of course, the IRD 1 and the monitor 2 are capable of performing data transmission of S100 at 98.308 Mbps.

In contrast, both apparatuses of the MD deck 3 and the digital VTR 6 fulfill the specification for S200; however, the digital VTR 4 having the specifications for S100 is present on the data transmission path. Therefore, the upper limit of the data transmission rate of the MD deck 3 and the digital VTR 6 is 98.308 Mbps which is the specification for S100.

Next, a description is given of the communication protocol of data transmission defined in IEEE1394. FIG. 23 illustrates the structure of the functions of the IEEE1394 protocol (protocol: communication convention). The IEEE1394 protocol has a hierarchical structure of three layers: a transaction layer (Transaction Layer) 22, a link layer (Link Layer) 23, and a physical layer (Physical Layer) 24. The hierarchies communicate with each other, and the respective hierarchies communicate with a serial bus management (Serial Bus Management) 21. Furthermore, the transaction layer 22 and the link layer 23 communicate with another function block. There are four types of transmission and reception messages used for this communication: request (Request), indication (Indication), response (Response), and confirmation (Confirmation). The arrows in FIG. 23 indicate this communication. A communication followed by ".req" at the end of the name of the arrow represents a request. In a similar manner, ".ind" represents an indication, ".resp" represents a response, and ".conf" represents a confirmation. For example, TR_CONT.req is a communication for request sent from the serial bus management to the transaction layer 22.

The transaction layer 22 provides an asynchronous data transmission service provided to perform data transmission with another predetermined apparatus in accordance with a request from another function block, and realizes a request response protocol (Request Response Protocol) required in ISO/IEC13213. The transaction layer 22 performs an asynchronous transmission process, but does not perform an isochronous transmission process for transmitting data, such as images or sound. The data transmitted in the asynchronous transmission is transmitted, among apparatuses, by three types of transactions: a read transaction, a write transaction, and a lock transaction which are units of processing for making a request to the protocol of the transaction layer 22. Here, the lock transaction is used to eliminate detrimental effects by split transaction (Split Transaction) composed of two or more subactions of the link layer 23 in the asynchronous communication.

The link layer 23 performs a data transmission service using acknowledge, address processing, data error confirmation, framing of data, etc. A request for an asynchronous transmission service from another function block is made to the link layer 23. One packet transmission performed by the link layer 23 is called a subaction, and as subactions, there are two types: an asynchronous subaction, and an isochronous subaction. In the physical ID (Identification Data) which specifies a node and in an asynchronous subaction which specifies an address within the node, the node which has received the data returns an acknowledgement. In an isochronous broadcast subaction which sends data to all nodes inside the IEEE1394 serial bus, the node which has received the data does not return an acknowledgement. The data of the isochronous subaction is transmitted at a fixed cycle with a channel number being specified, and an acknowledgement is not returned.

The physical layer 24 converts a logic symbol used in the link layer 23 into an electrical signal. Furthermore, the physical layer 24 performs control so that only one node initiates data transmission by arbitration, performs re-configuration of the IEEE1394 serial bus as a result of bus reset, and performs automatic assignment of the physical ID.

The serial bus management 21 realizes the basic bus control function and provides CSR (Control&Status Register Architecture) of ISO/IEC13213. The serial bus management 21 has the functions of a node controller, an isochronous resource manager, and a bus manager. The node controller controls the status of a node, the physical ID, and so on, and controls the transaction layer 22, the link layer 23, and the physical layer 24. In order to perform isochronous communication, at least one apparatus having the function of an isochronous resource manager is required among the apparatuses connected to the IEEE1394 serial bus. The bus manager aims at pursuing the optimum utilization of the IEEE1394 serial bus, which is the highest function among the functions. The presence of the isochronous resource manager and the bus manager is arbitrary.

FIG. 24 shows an example of the structure of an asynchronous subaction which specifies the physical ID and the address within the node, which is a method of communication with an IEEE1394 serial bus. This example is such that in subaction1 (subaction1: request in FIG. 24), a first predetermined node transfers a packet for making a read request or a write request to a second predetermined node, and in subaction2 (subaction2: response in FIG. 24), a second predetermined node responds to that request with respect to the first predetermined node. The asynchronous subaction is composed of arbitration sequences (Arbitration Sequences) 31-1 and 31-2, data packet transmissions 32-1 and 32-2, and acknowledgements 33-1 and 33-2. The node which wants to transmit an asynchronous packet requests a physical layer to be described later to perform control of the IEEE1394 serial bus in the period of the arbitration sequences 31-1 and 31-2. By arbitration, the node which is determined as a transmission node transmits an asynchronous packet in the period of the data packet transmissions 32-1 and 32-2. The node which has received the asynchronous packet which has specified the receiving node returns an acknowledgement to the node which has transmitted the packet in the period of the acknowledgements 33-1 and 33-2 for the purpose of confirming reception.

As shown in FIG. 24, the section between the asynchronous subaction is divided by periods called subaction gaps 34-1 to 34-3. Further, the section between the data packet transmissions 32-1 and 32-2 and between the acknowledgements 33-1 and 33-2 are divided by periods called acknowledge gaps (ack gaps) 35-1 and 35-2.

FIG. 25 shows the structure of an isochronous subaction which is another subaction. The isochronous subaction is composed of arbitration sequences 41-1 to 41-3 and data packet transmissions 42-1 to 42-3. A node which wants to transmit an isochronous packet requests a physical layer to be described later to control the IEEE1394 serial bus in the period of the arbitration sequences 41-1 to 41-3. The operation of each node in the isochronous subaction is the same as the operation of each node in the asynchronous subaction. In the period of the arbitration sequences 41-1 to 41-3, the node which has been determined as a transmission node transmits an isochronous packet in the period of the data packet transmissions 42-1 to 42-3. The isochronous subaction is divided by periods called isochronous gaps (isoch gaps) 43-1 to 43-4 shorter than subaction gaps 34-1 to 34-3 which divide the asynchronous subaction. Due to the difference in the length between the isochronous gaps 43-1 to 43-4 and the subaction gaps 34-1 to 34-3, the arbitration sequences 41-1 to 41-3 for isochronous communication are started before arbitration sequences 31-1 and 31-2 for asynchronous communication, and a transmission node is determined. This operation takes precedence over the asynchronous communication.

FIG. 26 shows the cycle structure of data transmission of an apparatus connected by IEEE1394. In IEEE1394, data is divided into packets and transmitted on a time-division basis with a cycle of a length of 125 $\mu$s as a reference. This cycle is created by a cycle start signal supplied from a node having cycle master functions (one of the apparatuses shown in FIG. 22). For the asynchronous packet, a band (called a "band", although this is a time unit) required to transmit from the start of all cycles is secured. Therefore, in the isochronous transmission, transmission of data within a fixed time is ensured. However, when a transmission error occurs, there is no scheme for protection, and data is lost. In the time, which is not used for isochronous transmission, of each cycle, the node which has secured the IEEE1394 serial bus as a result of arbitration transmits an asynchronous packet. In the asynchronous transmission, use of acknowledgement and rewrite ensures reliable transmission, but timing of transmission is not fixed.

In order for a predetermined node to perform isochronous transmission, that node must support isochronous functions. Further, at least one of the nodes which support isochronous functions must have cycle master functions. In addition, at least one of the nodes connected to the IEEE1394 serial buses 8-1 to 8-5 must have functions of an isochronous resource manager.

FIG. 27 shows the ranges of periods of a gap required for transmission on the IEEE1394 serial bus. An arbitration reset gap is a period in which an arbitration enable bit possessed by each node on the IEEE1394 serial bus is set, and is a smallest period in which after all nodes which perform asynchronous transmission have completed transfer of packets, arbitration for asynchronous transmission can be initiated again.

In order to increase the operation speed of the IEEE1394 serial bus, it is necessary to set the subaction gap and the arbitration reset gap to the smallest period in a range where the normal operation of arbitration is ensured. Specifically, this can be realized by setting gap_cnt, which is a node variable to be described later, in accordance with the topology of the IEEE1394 serial buses.

FIG. 28 illustrates the relationship among the delay of packet transmission on the IEEE1394 serial bus, an arbitration reset gap, and a subaction gap. In the packet transmission, a delay occurs in the packets due to the propagation of an electrical signal through the cable and the repetition of an electrical signal of the physical layer to be described later. That is, when a packet is transmitted from a node A to a node C, the packet sent from the node A reaches a node B at a time later than the time at which it has been sent from the node A due to a delay which occurs due to the propagation of the electrical signal through the cable, and reaches the node C at a time even later than at the node B. The greater the number of hops of the cables involved in packet transmission and the number of nodes through which relay is conducted, the greater the delay of this packet. That is, the delay time which occurs in the packet transmission varies in accordance with the topology of the buses.

When the arbitration reset gap becomes shorter than a period in which the delay of the packet and the subaction gap are added together, an arbitration enable bit is not set, and the arbitration operation will not be performed normally.

In a manner as described above, in the specifications for the IEEE1394 serial bus, the function called a bus manager which provides information of the highest data transmission rate at which communication is possible among arbitrary apparatuses on the bus, to an apparatus on the bus, is defined. When a plurality of apparatuses have the function of a bus manager, the bus manager of one of the apparatuses connected to the IEEE1394 serial bus operates effectively. The apparatus connected to the IEEE1394 serial bus sets the rate of data transmission to an apparatus to which it wants to transmit on the basis of the information of the speed map of the bus manager, and performs communication at the highest data transmission rate at which communication is possible. Further, by using the data of the topology map possessed by the bus manager, the subaction gap and the arbitration reset gap are set to the shortest period.

However, in the specifications of the IEEE1394 serial bus, a method for determining the highest communication speed between two apparatuses on the IEEE1394 serial bus and a method for determining the most appropriate subaction gap and arbitration reset gap are not defined.

OBJECTS OF THE INVENTION

The present invention has been made in view of the above circumstances, and an object of this invention is to determine the highest communication speed between two apparatuses on a network.

Another object of this invention is to determine the topology of a network.

SUMMARY OF THE INVENTION

In order to attain the above objects, according to an aspect of the present invention, an information processing apparatus having unique information connected to a network together with a plurality of other information processing apparatuses each connected to the network and each having unique information is provided. The apparatus comprises a receiving means for receiving the unique information for identifying all of the information processing apparatuses on the network, and a network structure obtaining means for obtaining a network structure of the network based upon the unique information of all of the information processing apparatuses. The apparatus further comprises a counting means for counting a number of connections between all of the information processing apparatuses on the network based upon the network structure, and a controlling means for controlling communication timing of the information apparatuses on the network based upon the number of the connections. The network may be a bus interface, and the information processing apparatus may be an Audio/Visual apparatus.

The apparatus further comprises a topology map obtaining means for obtaining a topology map of the network based upon the unique information of each of the information processing apparatuses. The apparatus further comprises a topology map storing means for storing the topology map obtained by the topology map obtaining means, a storing means for storing appropriate timings corresponding to number of the connections, and the controlling means controls the communication timing with a use of the appropriate timings in the storing means.

The receiving means obtains self IDs defined in IEEE 1394-1995 standard as the unique information, which are outputted from each of the information processing apparatus on the network when a reset of the network occurs, and the topology map obtaining means obtains a topology map defined in IEEE 1394-1995 standard, and the topology map obtaining means further comprises a writing means for writing data to a length field of the topology map defined in IEEE 1394-1995 standard, a storing means for storing the self Ids, a counting means for counting a generation number, a number of nodes, and a number of self Ids, and a cyclic redundancy check setting means for setting a cyclic redundancy check for the topology map defined in IEEE 1394-1995 standard.

The apparatus also comprises parent node ID obtaining means for obtaining the parent node IDs of each of the information processing apparatuses based upon the unique information, speed map obtaining means for obtaining a speed map of the network based upon the unique information of each of the information processing apparatuses, and communicating means for communicating data at a speed based on the speed map.

The receiving means obtains self IDs defined in IEEE 1394-1995 standard as the unique information which are outputted from each of the information processing apparatuses on the network when a reset of the network occurs, and the speed map obtaining means obtains a speed map defined in IEEE 1394-1995 standard, and the speed map obtaining means further comprising a writing means for writing data to a length field of the speed map defined in IEEE 1394-1995 standard, a storing means for storing the self Ids, a counting means for counting a generation number, a number of nodes, and a number of self Ids, and a cyclic redundancy check setting means for setting a cyclic redundancy check for the speed map defined in IEEE 1394-1995 standard. Corresponding methods are described also.

BRIEF DESCRIPTION OF THE DRAWINGS

For a more complete understanding of the invention, reference is made to the following description and accompanying drawings, in which:

FIGS. 4A and 4B are diagrams showing an example of the structure of a self-ID packet;

FIG. 5 is a diagram illustrating the components of the self-ID packet;

FIG. 6 is a diagram showing the structure of a speed map;

FIG. 10 is a diagram illustrating a process for determining the node physical ID of the parent node of each node;

FIG. 27 is a diagram showing a range of the period of a gap required for transmission on the IEEE1394 serial bus.

DESCRIPTION OF THE PREFERRED EMBODIMENTS

The following is a detailed description of embodiments of the present invention with reference to the drawings. First, in order to clarify the relationship between each means of the invention as set forth in the claims and the embodiment described below, the features of the present invention are described below by including a corresponding embodiment (one example) within the parentheses after each means. Of course, this description does not limit each means thereto. ??? More specifically, the information processing apparatus as set forth in claim 1 comprises computation means (for example, an IEEE1394 interface 58 of FIG. 1) for computing the topology of a network on the basis of the information for identifying each information processing apparatus and the number of connections of each information processing apparatus to the network and for controlling the communication timing of each information processing apparatus.

Figure 1:
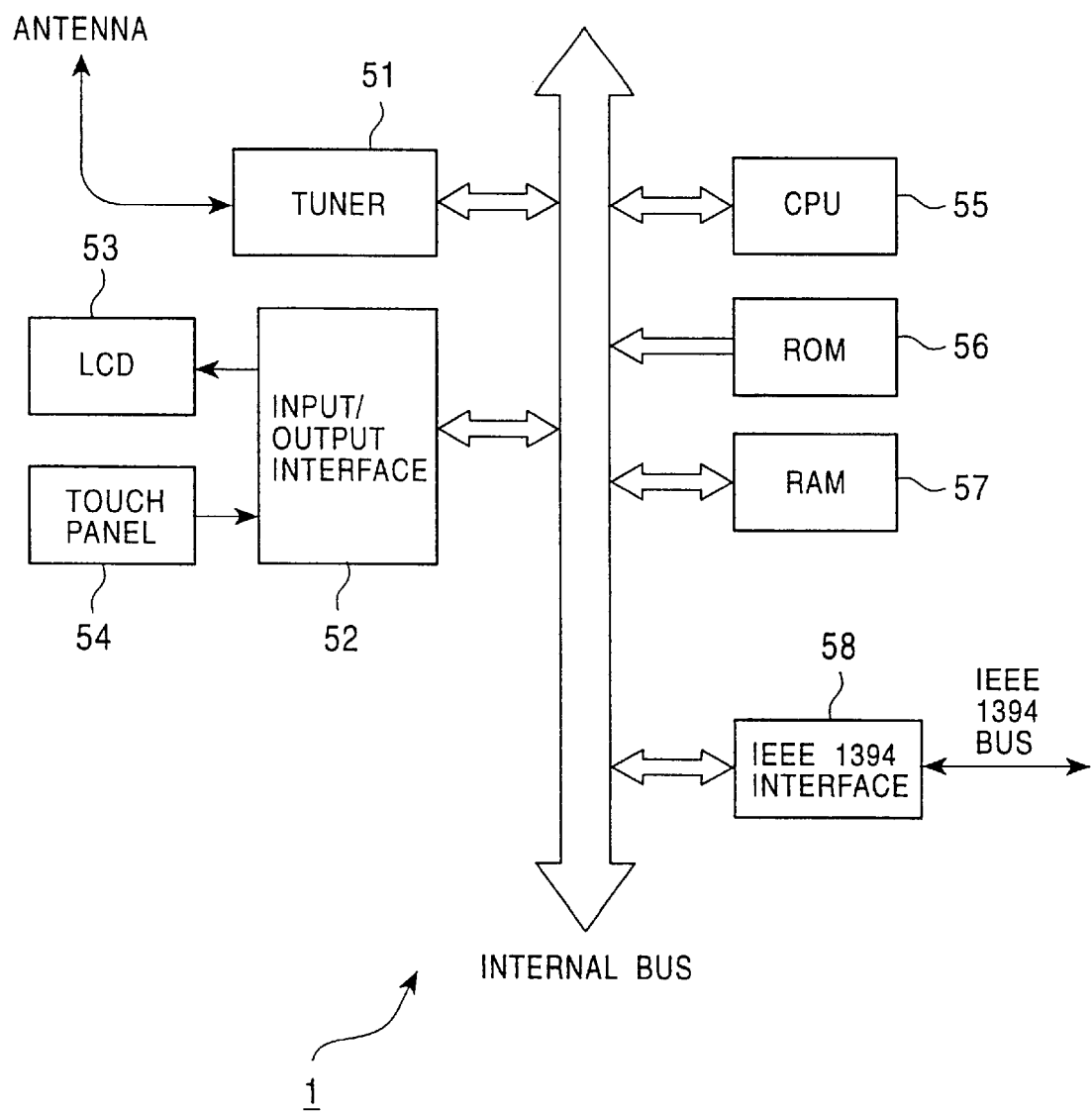
FIG. 1 is a block diagram showing a hardware configuration diagram of an IRD.
Figure 21:
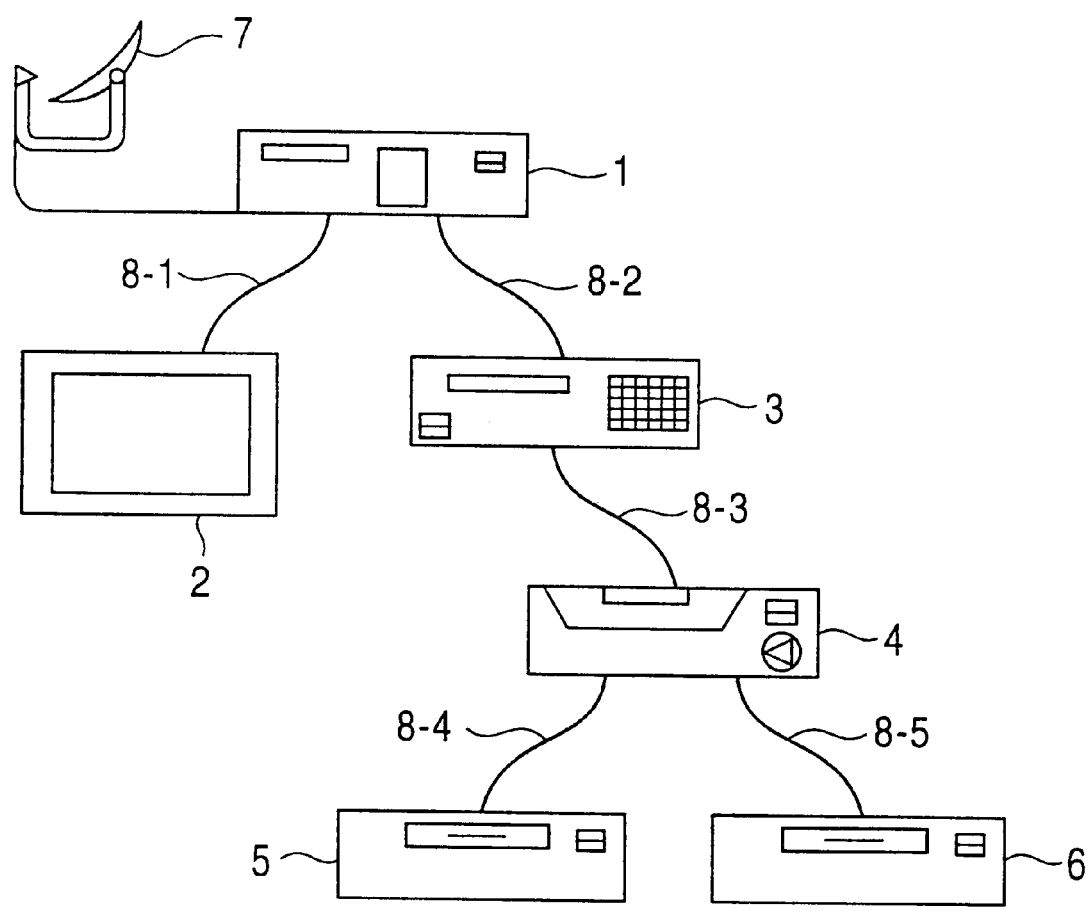
FIG. 21 is a diagram showing an example of a plurality of apparatuses connected to an IEEE1394 serial bus.
Figure 22:
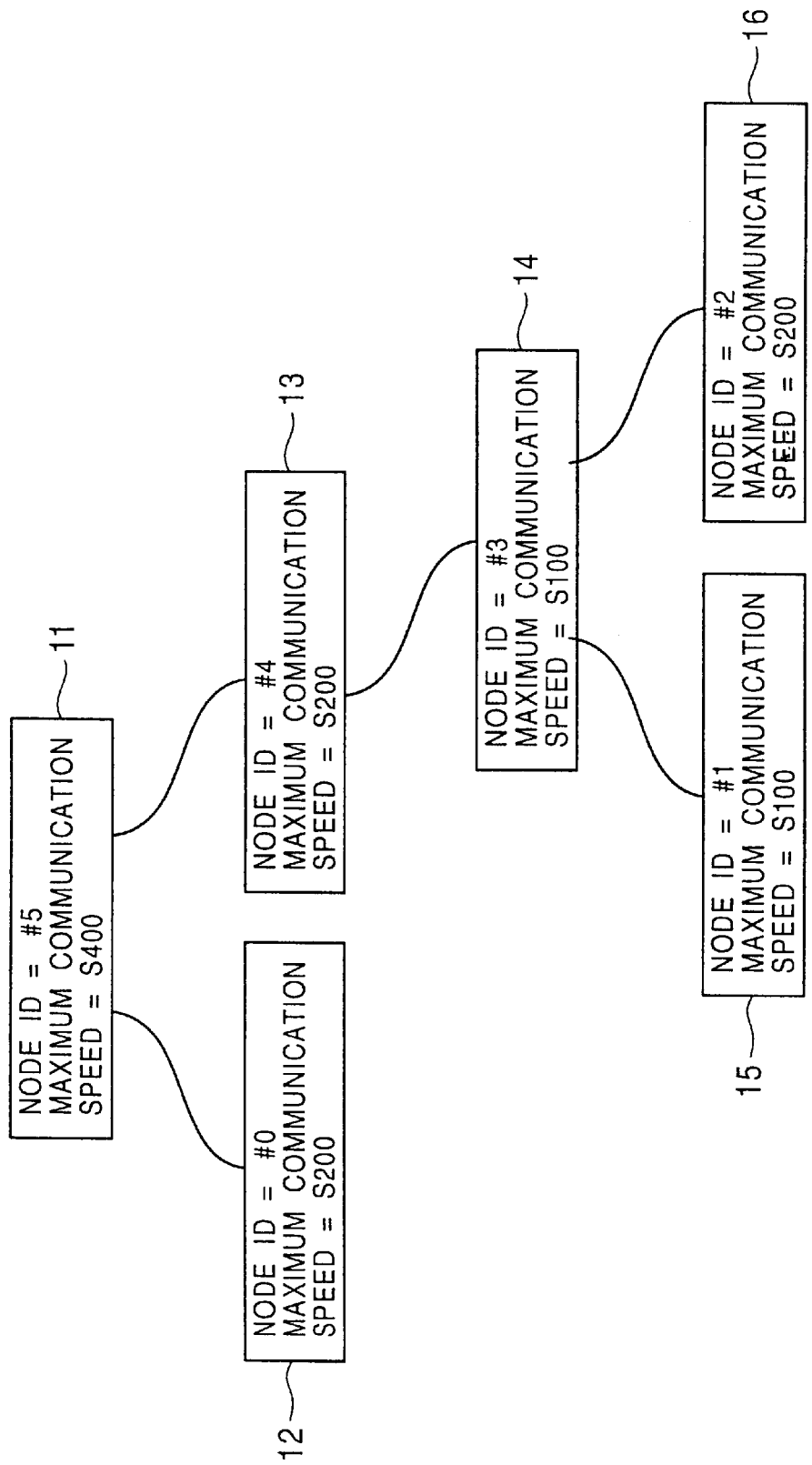
FIG. 22 is a diagram showing an example of a connection of apparatuses, in which the physical ID and the specifications of a data transmission rate are indicated within the node.
Figure 23:
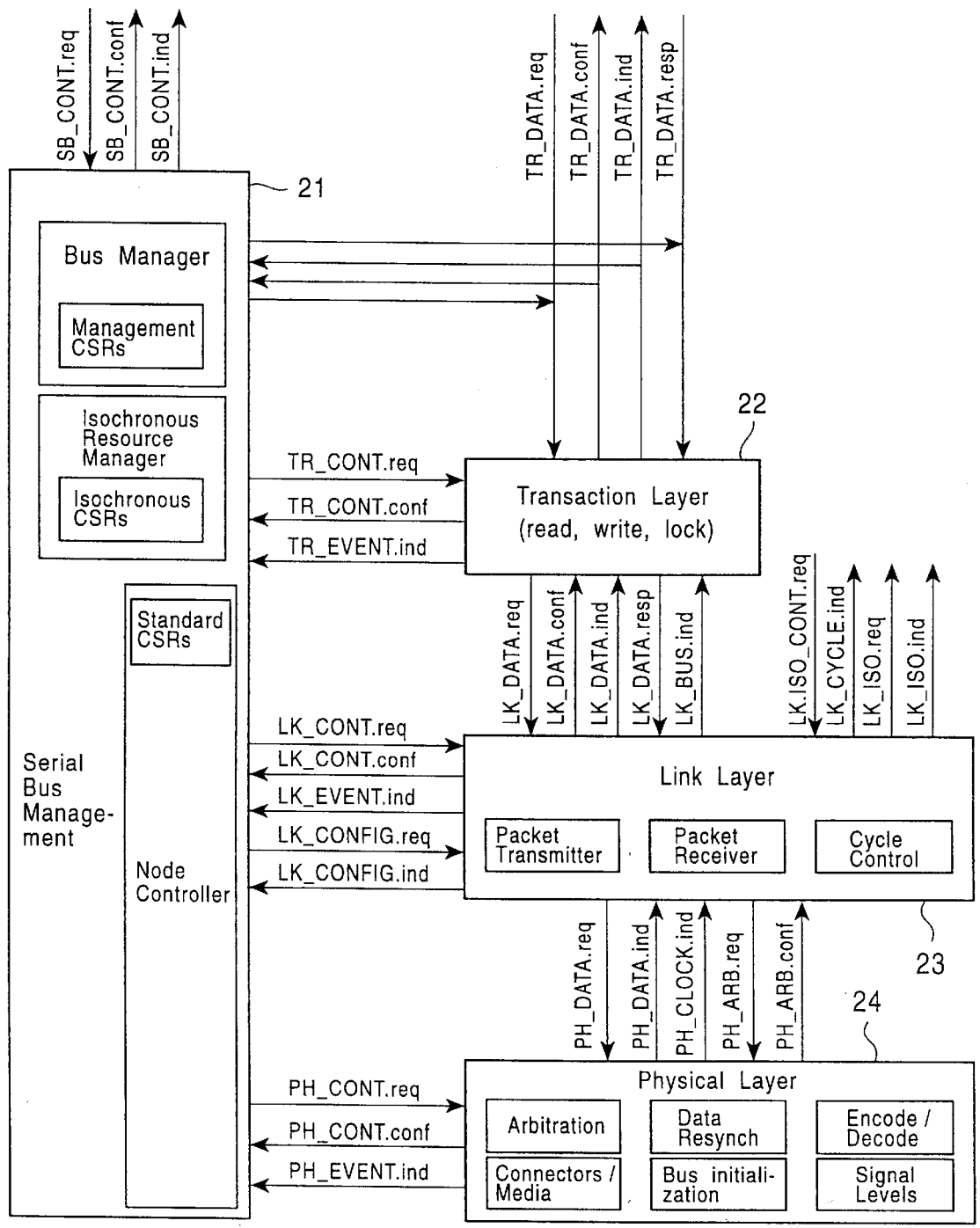
FIG. 23 is a diagram illustrating the structure of the function of an IEEE1394 protocol.
Figure 24:
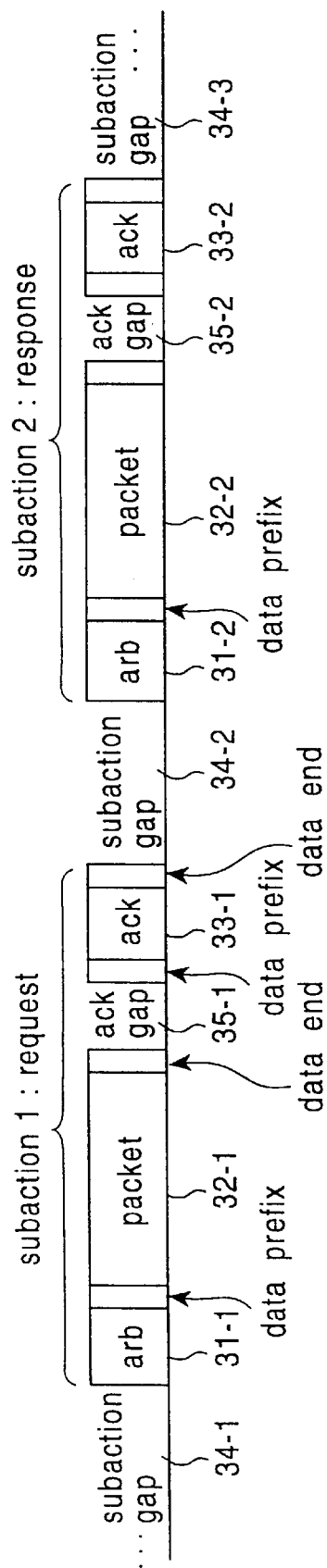
FIG. 24 is a diagram showing an example of the structure of an asynchronous subaction.
Figure 25:
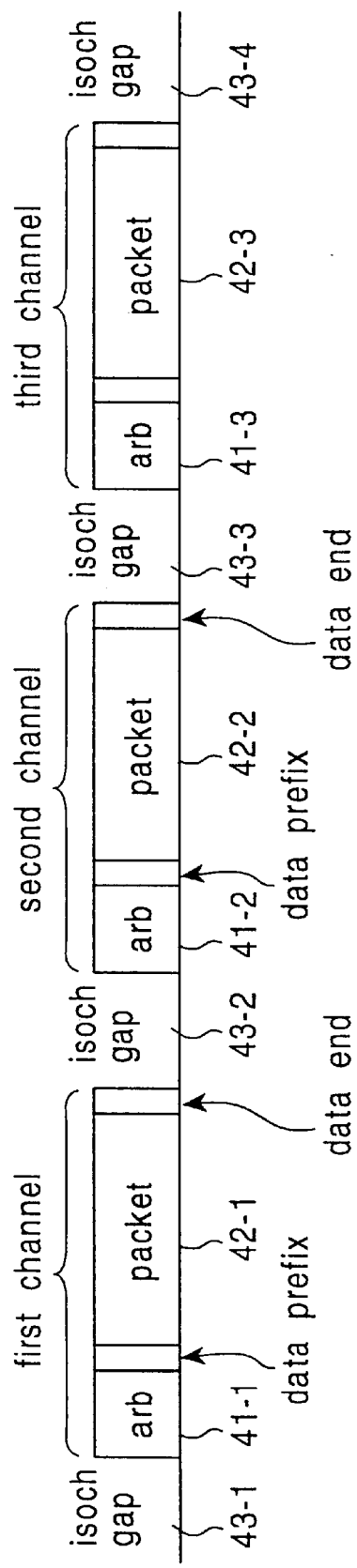
FIG. 25 is a diagram showing the structure of an isochronous subaction.
Figure 26:
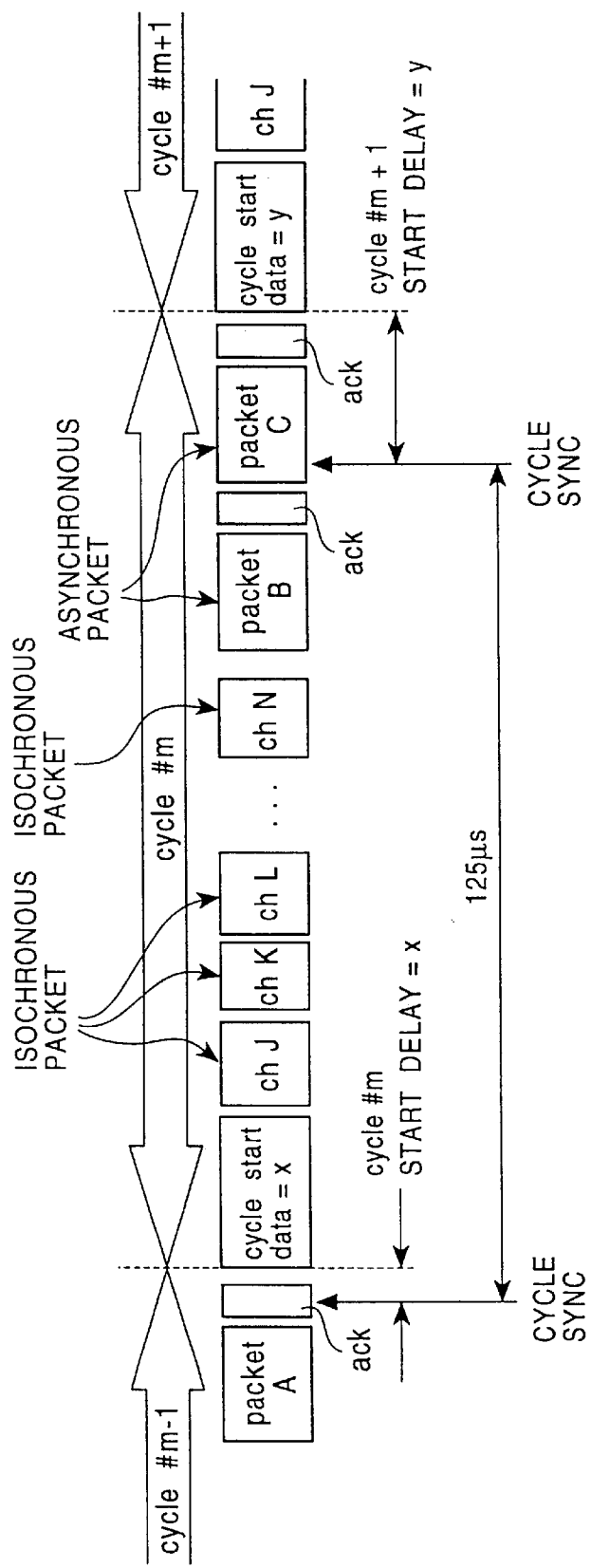
FIG. 26 is a diagram showing the cycle structure of data transmission of an apparatus connected by IEEE1394.
Figure 28:
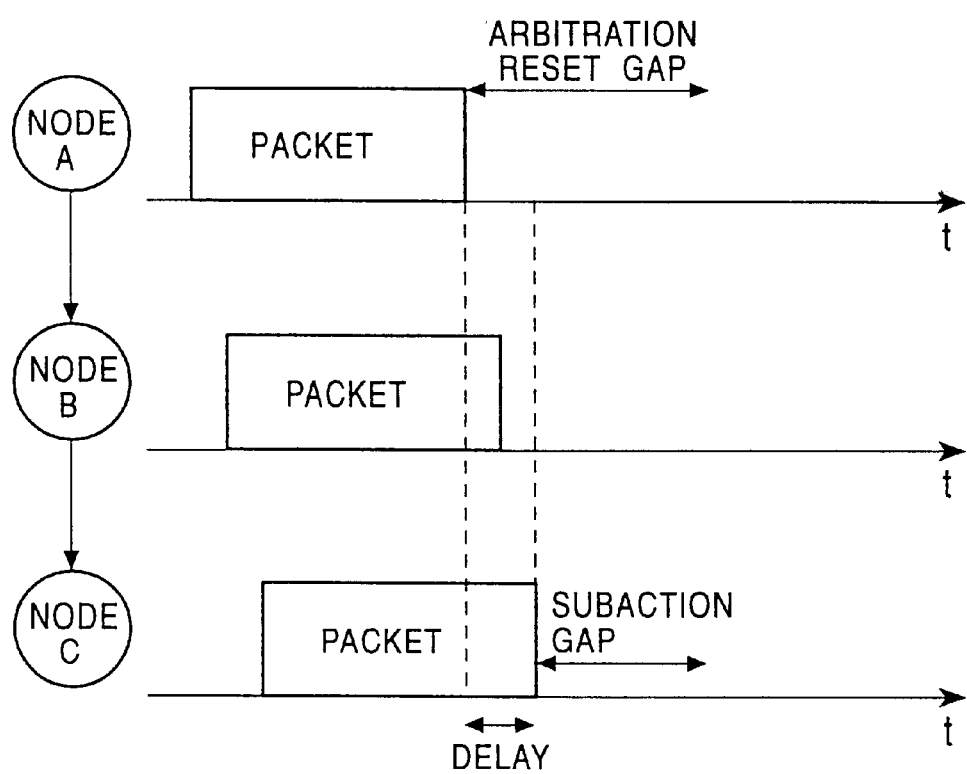
FIG. 28 is a diagram illustrating the relationship among a delay of packet transmission on the IEEE1394 serial bus, an arbitration reset gap, and a subaction gap.

The present invention will now be described below. It is assumed that, also in the present invention, the network is constructed as shown in FIGS. 21 and 22. FIG. 1 is a hardware configuration diagram of an IRD 1. A tuner 51 causes an antenna 7 to operate and outputs an image signal and an audio signal in accordance with a signal from the antenna 7. A LCD (liquid-crystal display) 53 and a touch panel 54 are connected to the internal bus through an input/output interface 52. The LCD 53 displays display data supplied from a CPU (central processing unit) 55 or an IEEE1394 interface 58. The touch panel 54 supplies a signal corresponding to the operation of a user to the input/output interface 52.

The CPU 55 performs various programs. A ROM (read only memory) 56 stores basically fixed data from among programs used by the CPU 55 and parameters for computations. A RAM (random access memory) 57 stores a program used in the execution of the CPU 55 and parameters which vary appropriately in the execution thereof. The IEEE1394 interface 58 is an input/output interface which complies with IEEE1394, to which IEEE1394 serial buses 8-1 to 8-5 are connected. The tuner 51, the input/output interface 52, the CPU 55, the ROM 56, the RAM 57, and the IEEE1394 interface 58 are connected with each other through the internal bus.

Figure 2:
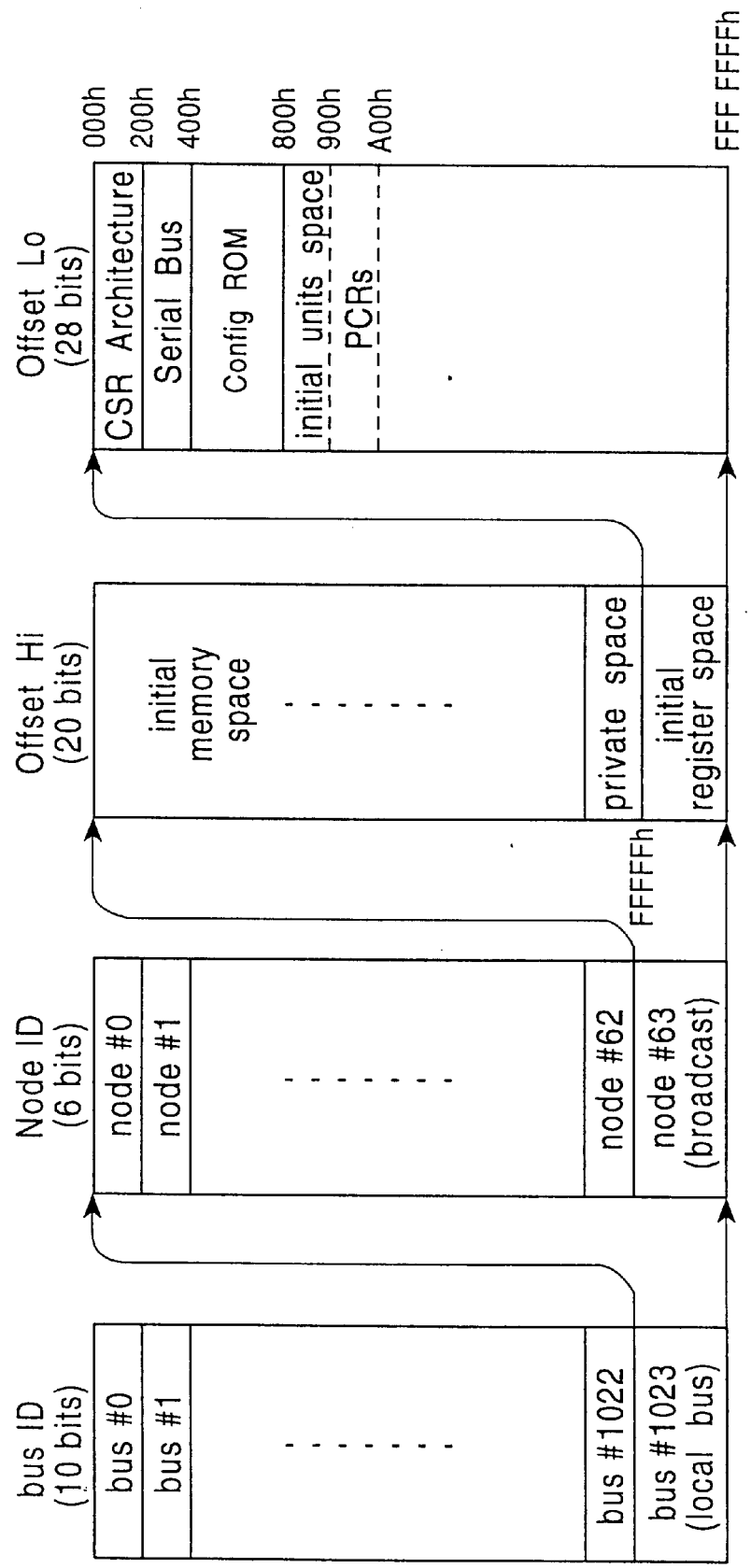
FIG. 2 is a diagram illustrating the structure of an address space of CSR architecture.

The IEEE1394 complies with the CSR (Control&Status Register) architecture having a 64-bit address space defined by ISO/IEC13213. FIG. 2 illustrates the structure of the address space of the CSR architecture. The high-order 16 bits are physical ID (Identification Data) which indicates the node on each IEEE1394, and the remaining 48 bits are used to specify an address space provided to each node. These high order 16 bits are further divided into the 10 bits of the bus ID and the 6 bits of the physical ID (physical ID in a narrow sense). Since the value at which all the bits become 1 is used for a special purpose, it is possible to specify 1023 buses and 63 nodes.

The space defined by the high-order 20 bits within the address space of 256 tera-bytes defined by the low-order 48 bits is divided into an initial register space of 2048 bytes used for a register specific to CSR, a register specific to IEEE1394, and so on, a private space, and an initial memory space. The space defined by the low-order 28 bits, when the space defined by the high-order 20 bits thereof is an initial register space, is used as a configuration ROM (read only memory), an initial unit space used for an application specific to a node, plug control registers (PCRs), etc.

Figure 3:
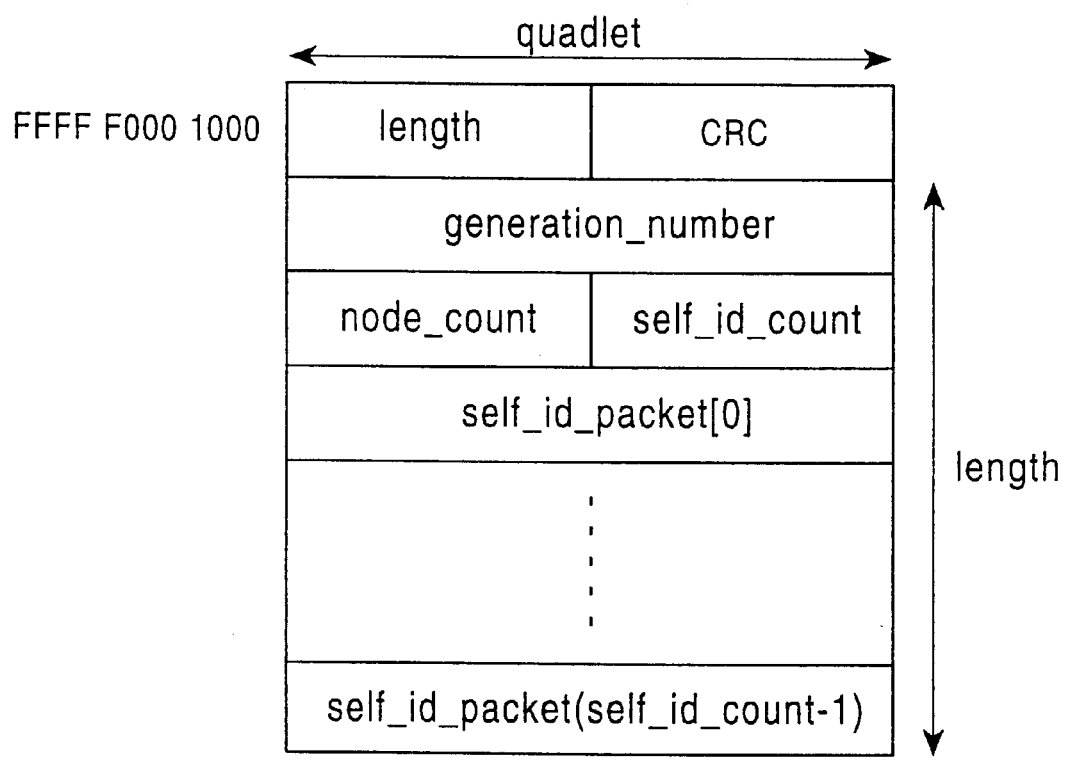
FIG. 3 is a diagram showing the structure of a topology map.

FIG. 3 shows the structure of a topology map disposed in the initial unit space of CSR of a node which operates as a bus manager. A length field stores a value which indicates the length after a generation number in units of quadlets (quadlet: 4 bytes). A node count (node_count) field stores a value which indicates the number of present nodes on the IEEE1394 serial bus. A self-ID count (self_id_count) field stores a value which indicates the number of self-ID packets [self_id_packet] to be stored in the topology map. Self-ID packets [0] to [self_ID_count−1] field stores an actual self-ID packet sent from each node. A CRC (Cyclic Redundancy Check) field stores a value for cyclic redundancy check for the object of the entire topology map.

Next, a description is given of a self-ID packet stored in the topology map. FIGS. 4A and 4B show an example of the structure of a self-ID packet. In a self-ID process, one of one to four self-ID packets is output from the physical layer 24 of each node. The self-ID packet shown in FIG. 4A is for the case in which it is single, or an example of a self-ID packet which is output first. The self-ID packet shown in FIG. 4B is for an example of the self-ID packet which is output as the second or later. The first 32 bits of the self-ID packet are effective data, and the remaining 32 bits are used for error detection.

FIG. 5 illustrates components of the self-ID packet. The contents described in the cells below the cell described as "name" of the uppermost line correspond to the name of the component of the self-ID packet of FIGS. 4A and 4B. The cell at the position of the intersection of the rightward extension area of the contents described in the cell downward of the cell described as "field" of the uppermost line and the downward extension area described as "field" of the uppermost line show the contents of the components of the self-ID packet of FIGS. 4A and 4B. The bus manager reads information stored in the field SP of the seventeenth bit or the eighteenth bit from the start to be transmitted and can be informed of the transfer speed performance of the node which has output the self-ID packet. The information which indicates the connection state of the port, stored in the fields P0 to P26, indicates one of four types: the connection partner is a child node, the connection partner is a parent node, the port is not connected, or the terminal does not exist. gap_cnt which determines the range of the subaction gap and the arbitration reset gap is stored in the eleventh to sixteenth bits from the start to be transmitted of the self-ID packet.

FIG. 6 shows the structure of a speed map disposed in the initial unit space of CSR of the node which operates as a bus manager. The length field stores a value which indicates the length after a generation number in units of quadlets (quadlet: 4 bytes). The generation number (generation_number) field stores a value which indicates the number of creations of the speed map. The speed code (speed_code) fields [0] to [4029] store a value which indicates the highest communication speed of two nodes. The value which indicates the highest communication speed of a node m and a node n is stored in the speed code field [64 (m+n)]. For example, the value which indicates the highest communication speed of a node 0 and a node 2 is stored in a speed code field [2]. In the case of the structure in FIG. 21, a value which indicates S100 is stored in the speed code field [2].

Figure 7:
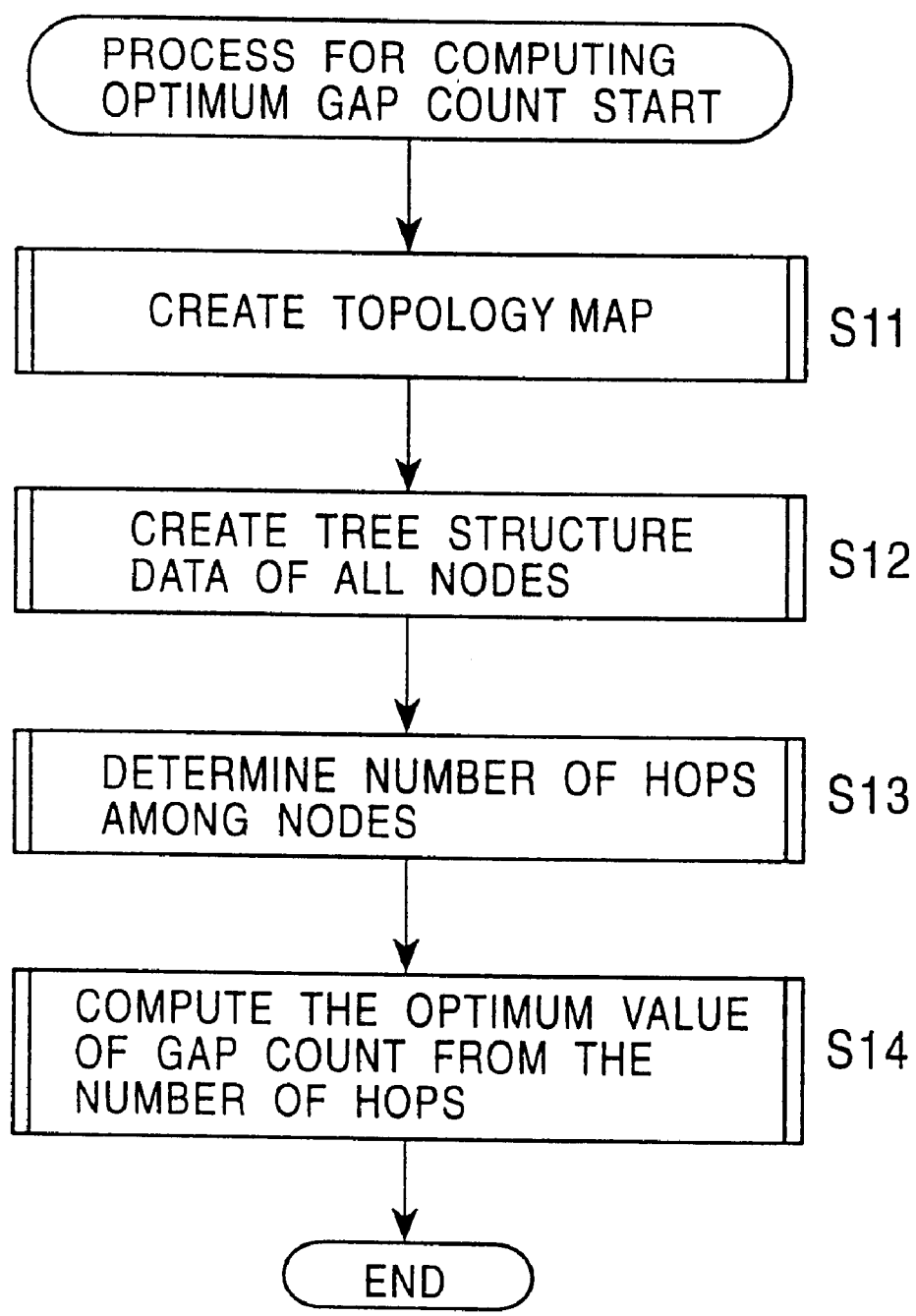
FIG. 7 is a flowchart illustrating a process for computing the value of the optimum gap count.

FIG. 7 is a flowchart illustrating a process for computing the value of an optimum gap count. In step S11, the bus manager (possessed by, for example, the IRD 1 in FIG. 21) creates a topology map. In step S12, the bus manager creates tree structure data composed of transfer speed performance, the number of child nodes, and the ID of the parent node, of all the nodes connected to the bus. In step S13, the bus manager determines the number of hops with respect to the combination of all the nodes connected to the bus. In step S14, the bus manager computes the optimum value of the gap count on the basis of the number of hops determined in step S13, sets the optimum value of the gap count in each node, and the processing is terminated. A description is given in detail below of a process of each step of FIG. 7.

Figure 8:
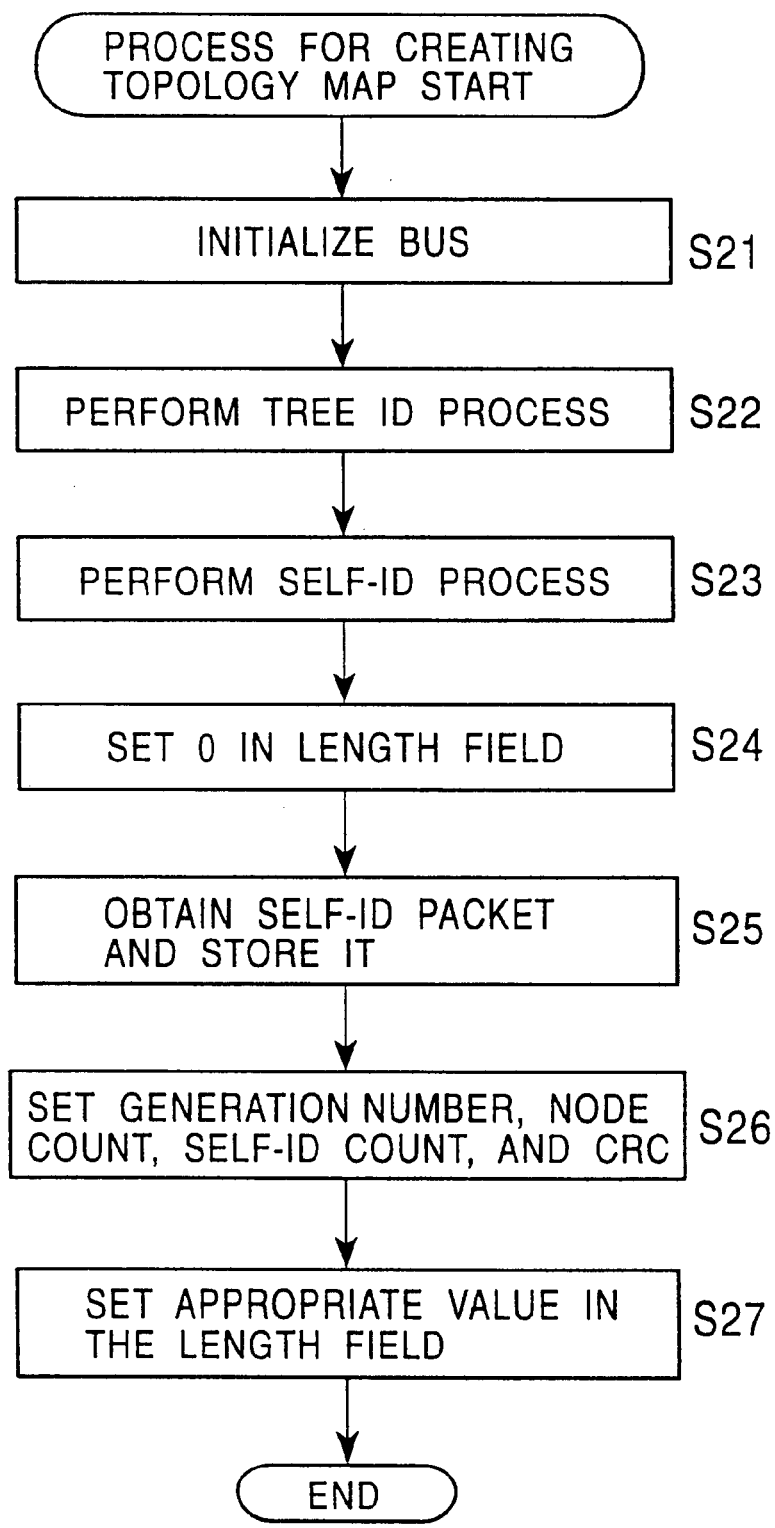
FIG. 8 is a flowchart illustrating a process for creating a topology map.

FIG. 8 is a flowchart illustrating a process for creating a topology map in step S11 of FIG. 7. In step S21, the bus manager writes a predetermined value in a reset start register of the CSR, and performs command resetting of the bus. In step S22, the physical layer 24 of each node performs a tree ID process, and sets one of the values of the branch and the leaf in each node. In step S23, the physical layer 24 of each node performs a self-ID process and provides the physical ID to each node. In step S24, the bus manager sets 0, which is an initial value, in the length field of the topology map. In step S25, the bus manager obtains the self-ID packet sent from each node and stores it at a predetermined position of the topology map. In step S26, the bus manager sets the generation number, the node count, the self-ID count, and the CRC to predetermined values. In step S27, the bus manager sets an appropriate value in the length field. In a manner as described above, the bus manager creates a topology map from the self-ID packet sent from each node.

Figure 9:
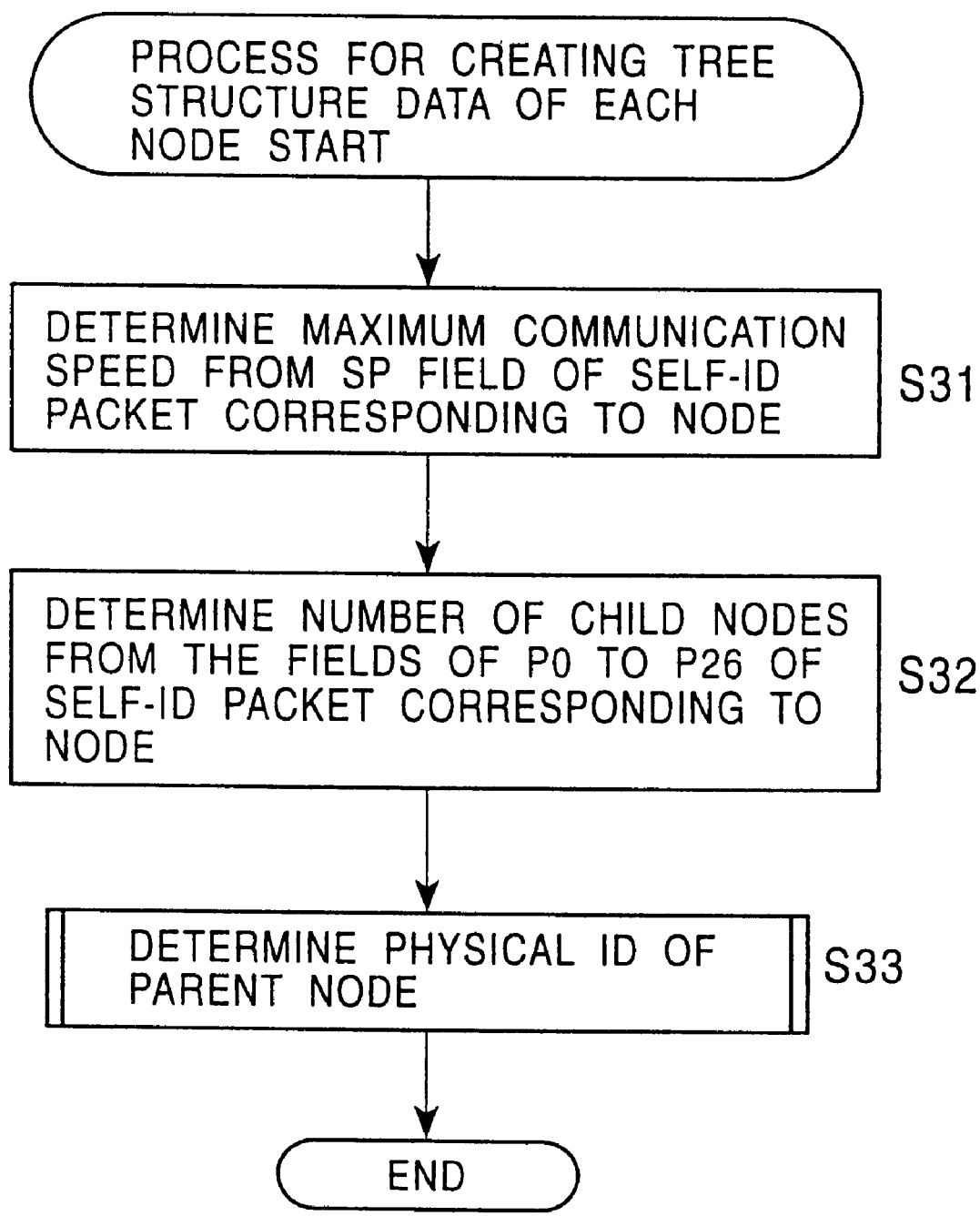
FIG. 9 is a flowchart illustrating a process for creating the tree structure data of each node.

FIG. 9 is a flowchart illustrating a process for creating tree structure data of each node in step S12 of FIG. 7. The tree structure data is composed of data indicating the highest communication speed of each node, the number of child nodes of each node, and the physical ID of the parent node of each node. In step S31, the bus manager reads a value from the SP field of the self-ID packet corresponding to each node stored in the topology map. In step S32, the bus manager determines the number of child nodes of each node from the fields of P0 to P26 of the self-ID packet corresponding to each node stored in the topology map. In step S33, the bus manager determines the physical ID of the parent node of each node.

Next, a description is given of a process for determining the physical ID of the parent node in step S33 of the flowchart of FIG. 9. FIGS. 10 and 11 illustrate a process for determining the physical ID of the parent node of each node when the connection shown in FIG. 22 is made. When step S32 of FIG. 9 is terminated, as shown in FIG. 10, the bus manager has the information indicating the physical ID and the number of children of each node. The physical ID of the node connected to the IEEE1394 serial bus is smaller than the physical ID of the parent node, and the number of parent nodes of each node is 1 or 0. By using this condition and a stack having a last-in first-in structure, the physical ID of the parent node of each node is determined.

Figure 11A:
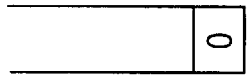
FIGS. 11A, 11B, 11C, 11D, 11E, 11F, 11G, 11H, and 11I are diagrams illustrating a process for determining the node physical ID of the parent node of each node.
Figure 11B:
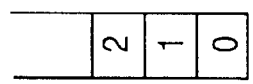
Figure 11C:
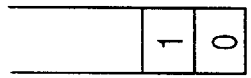
Figure 11D:
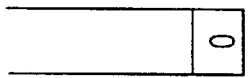

FIGS. 11A, 11B, 11C, 11D, 11E, 11F, 11G, 11H, and 11I illustrate the operation of a stack for computing the physical ID of the parent node. This process for computing the physical ID of the parent node is performed by tracing in sequence from the node with a smaller physical ID to a node with a greater physical ID. FIG. 11A shows an initial state of a stack. The stack is null in the initial state. FIG. 11B shows a state in which the stack traces a node 0. Since the number of children of the node 0 is zero, the stack stores 0 which is the physical ID of the node 0. FIG. 11C shows a state in which the stack traces a node 1. Since the number of children of the node 1 is zero, the stack stores 1, which is the physical ID of the node 1, on 0. FIG. 11D shows a state in which the stack traces node 2. Since the number of children of the node 2 is zero, the stack stores 2 which is the physical ID of the node 2 on 1.

Figure 11E:
Figure 11F:
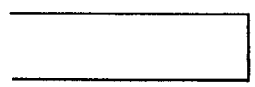
Figure 11G:
Figure 11H:
Figure 11I:
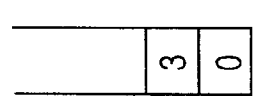

FIG. 11E shows the initial state in which the stack traces a node 3. Since the number of children of the node 3 is 2, the stack pops up two values 2 and 1, which are stored above. This shows that the parent node of the node 1 and the node 2 is the node 3. FIG. 11F shows the next state when the stack traces the node 3. "3" which is the physical ID of the node 3 is stored on the remaining value 0. FIG. 11G shows the initial state in which the stack traces a node 4. Since the number of children of the node 4 is 1, the stack pops up one value 3, which is stored above. This shows that the parent node of the node 3 is the node 4. FIG. 11H shows the next state when the stack traces the node 4. "4", which is the physical ID of the node 4, is stored on the remaining value 0. FIG. 11I shows a state in which the stack traces a node 5. Since the number of children of the node 5 is 2, the stack takes out two stored values 4 and 0. This shows that the parent node of the node 4 and the node 0 is the node 5. Since the node 5 has the maximum physical ID, it can be seen that it is a root node. In a manner as described above, it is possible for the bus manager to compute the physical ID of the parent node with respect to each node.

Figure 12:
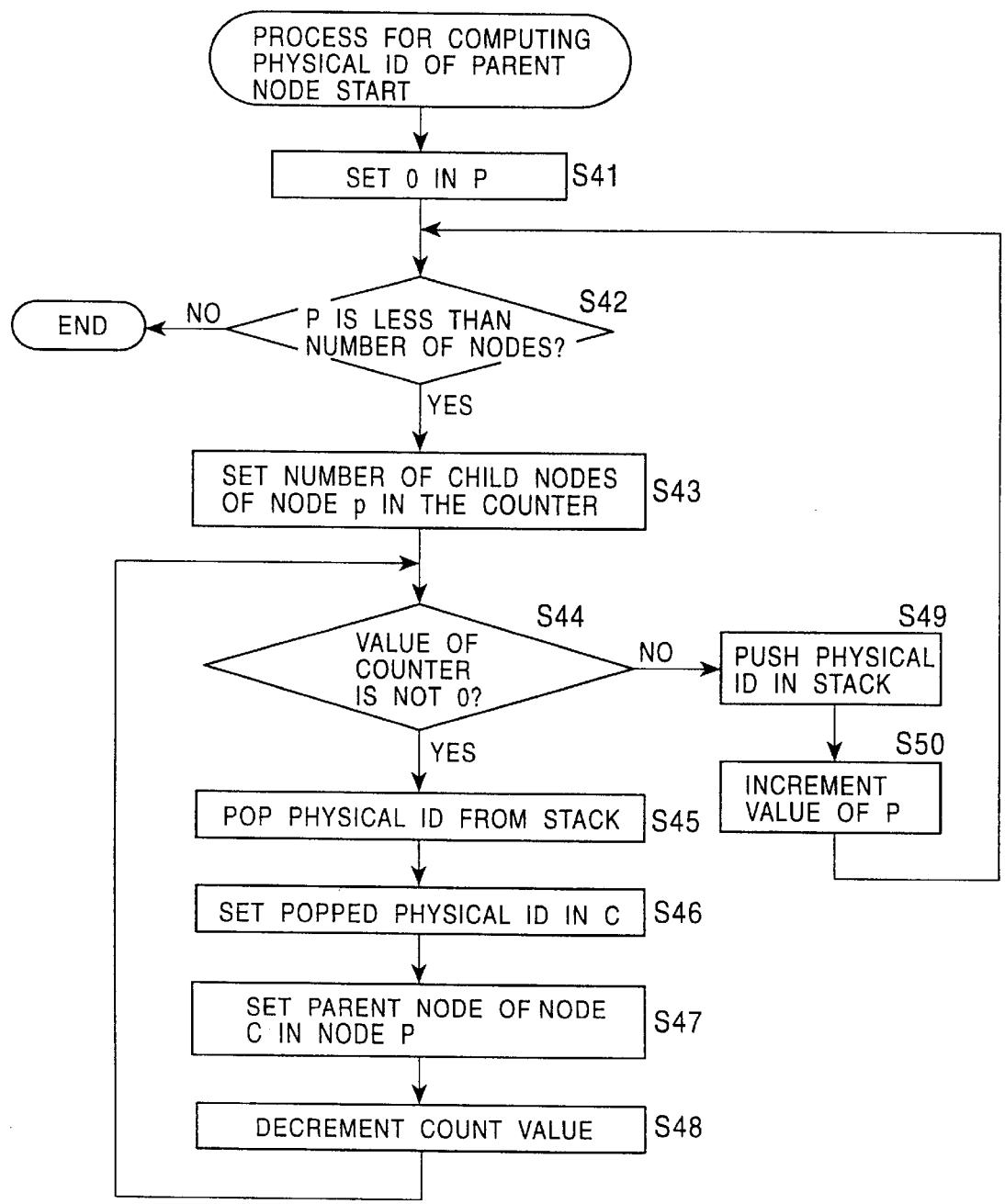
FIG. 12 is a flowchart illustrating a process for computing the physical ID of the parent node.

FIG. 12 is a flowchart illustrating a process for computing the physical ID of the parent node. In step S41, the bus manager sets 0, which is an initial value, in a variable P which indicates a node to be traced. In step S42, the bus manager determines whether or not P is less than the number of nodes connected to the bus. When it is determined that P is less than the number of nodes connected to the bus, the process proceeds to step S43 where the number of child nodes of the node P is set in the counter. In step S44, the bus manager determines whether or not the value of the counter set in step S43 is 0. When it is determined that the value of the counter is not 0, the process proceeds to step S445 where the physical ID is popped up from the stack. In step S46, the bus manager sets the physical ID popped in step S45 in a variable C. In step S47, the bus manager sets the node P in the parent node of the node C. In step S48, the bus manager decrements the count value, and the process returns to step S44 and the processing is continued.

When it is determined in step S44 that the value of the counter is 0, the process proceeds to step S49 where the bus manager pushes, the physical ID into the stack. In step S50, the bus manager increments the variable P, and the process returns to step S42 and the processing is continued. When it is determined in step S42 that P is equal to or greater than the number of nodes connected to the bus, the process is terminated.

Figure 13:
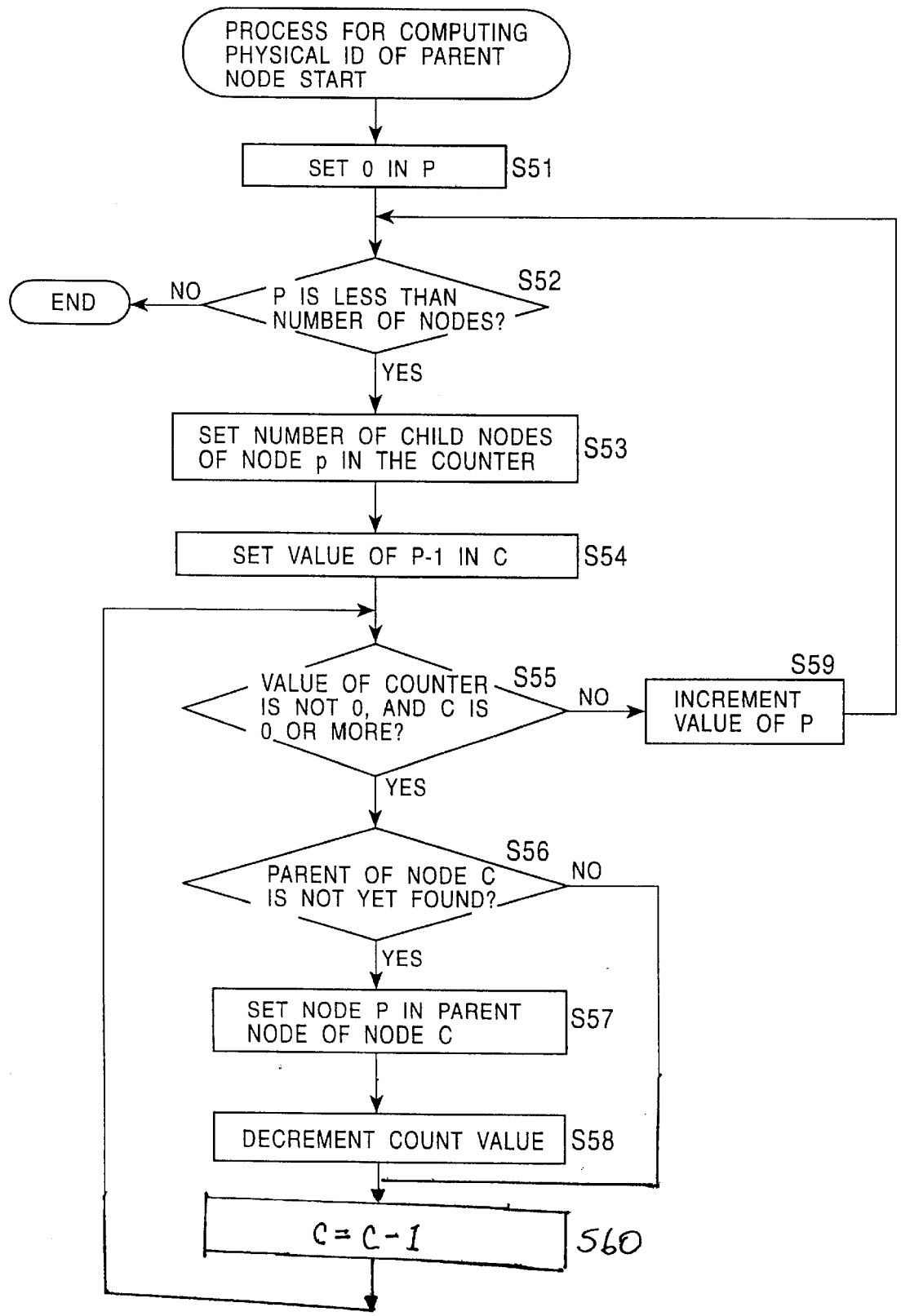
FIG. 13 is a flowchart illustrating another process for computing the physical ID of the parent node which does not use a stack.

FIG. 13 is a flowchart illustrating another process for computing the physical ID of the parent node which does not use a stack. In step S51, the bus manager sets 0, which is an initial value, in the variable P which indicates a node to be traced. In step S52, the bus manager determines whether or not P is less than the number of nodes connected to the bus. When it is determined that P is less than the number of nodes connected to the bus, the process proceeds to step S53 where the number of nodes of children of the node P is set in the counter. In step S54, the bus manager sets the value of P−1 in the variable C. In step S55, the bus manager determines whether or not the value of the counter is not 0 and C is equal to or greater than 0. When it is determined that the value of the counter is not 0 and C is equal to or greater than 0, the process proceeds to step S56 where a determination is made as to whether or not the node of the parent of the node C has been found. When it is determined in step S56 that the node of the parent of the node C has not been found, the process proceeds to step S57 where the bus manager sets the node P in the parent node of the node C and then proceeds to step S58. In step S58, the bus manager decrements the count value, and then proceeds to step S60. When it is determined in step S56 that the node of the parent of the node C has been found, the process skips step S57 and S58 and proceeds to step S60. In step S60 the value of C is set at C−1, and the process returns to step S55 and the processing is continued. When it is determined in step S55 that the value of the counter is 0 or C is less than 0, the process proceeds to step S59. In step S59, the bus manager increments the value of P, and the process returns to step S52 and the processing is continued. When it is determined in step S52 that P is equal to or greater than the number of nodes connected to the bus, the processing is terminated. In the manner described above, the bus manager can compute the physical ID of the parent node with respect to each node by the processing of FIG. 12 or the processing of FIG. 13.

Figure 14:
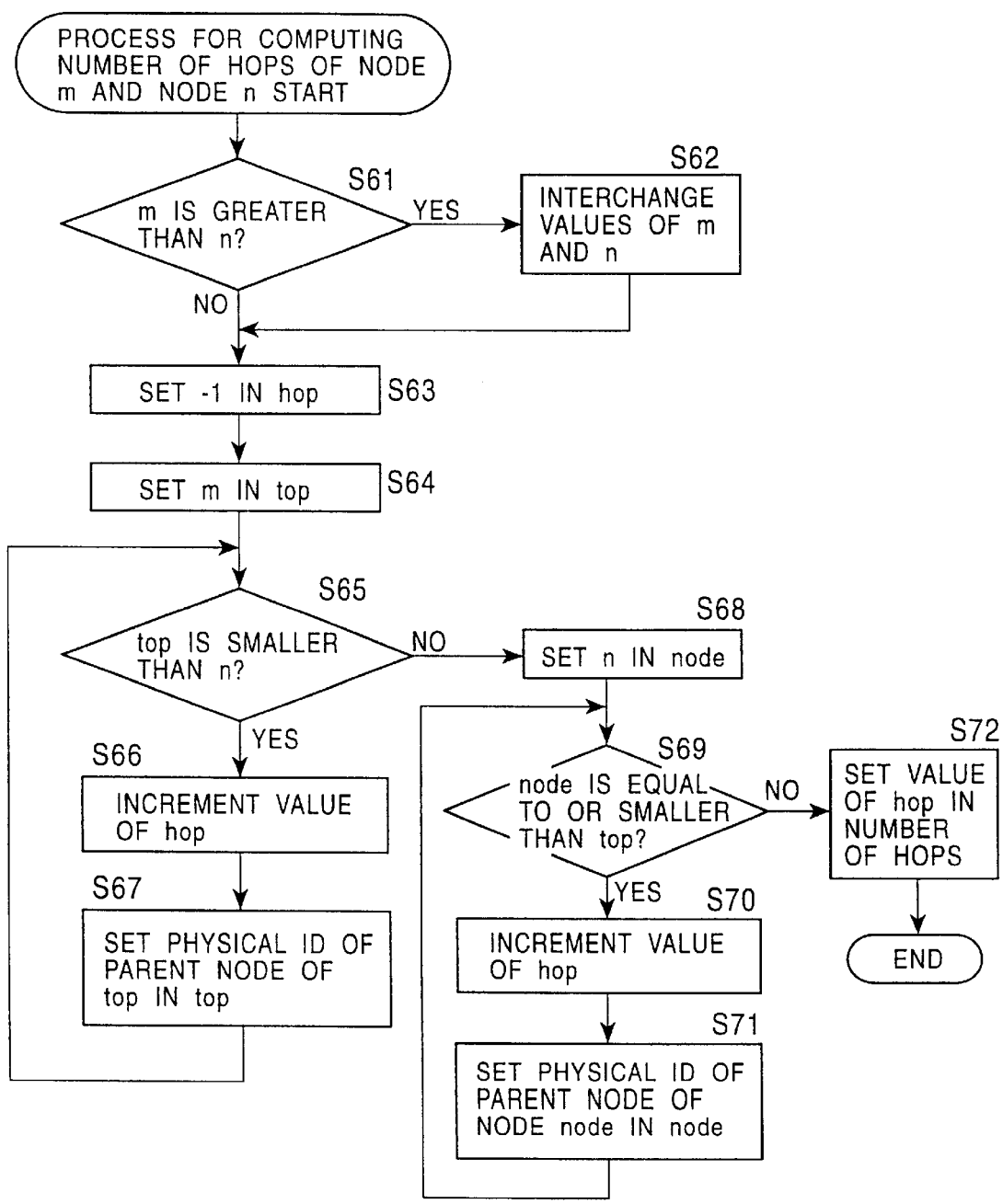
FIG. 14 is a flowchart illustrating a process for computing the number of hops between a node m and a node n.

Next, a description is given of a process for determining the number of hops among nodes. FIG. 14 is a flowchart illustrating a process for computing the number of hops between the node m and the node n, which is performed in step S13 of FIG. 7. In step S61, the bus manager compares m with n in order to determine whether or not m is greater than n. When it is determined that m is greater than n, in step S62, the values of m and n are interchanged, and the process proceeds to step S63. When it is determined in step S61 that m is not greater than n, the process proceeds to step S63. In step S63, the bus manager sets −1, which is an initial value, in a hop. The hop is a counter for the number of hops. In step S64, the bus manager sets m of a variable top. The top is a variable for storing the physical ID of the apex when a search is made from the node m to the root. In step S65, the bus manager compares the top with n in order to determine whether or not the top is smaller than n. When it is determined that the top is smaller than n, the process proceeds to step S66 where the value of hop is incremented. In step S67, the bus manager sets in top the physical ID of the parent node of the top, and the process returns to step S65 and the processing is continued.

When it is determined in step S65 that the top is equal to or greater than n, the process proceeds to step S68 where n is set in a variable node. The node is a variable for storing the physical ID of the apex when a search is made from the node n toward the root. In step S69, the bus manager determines whether or not the node is equal to or smaller than top. When it is determined that the node is equal to or smaller than top, the process proceeds to step S70 where the value of hop is incremented. In step S71, the bus manager sets in the node the physical ID of the parent node of the node "node", and the process returns to step S69 and the processing is continued. When it is determined in step S69 that the node is greater than top, the process proceeds to step S72 where the bus manager sets the value of hop in the number of hops, and the processing is terminated. In a manner as described above, it is possible for the bus manager to compute the number of hops between the node m and the node n.

Figure 15:
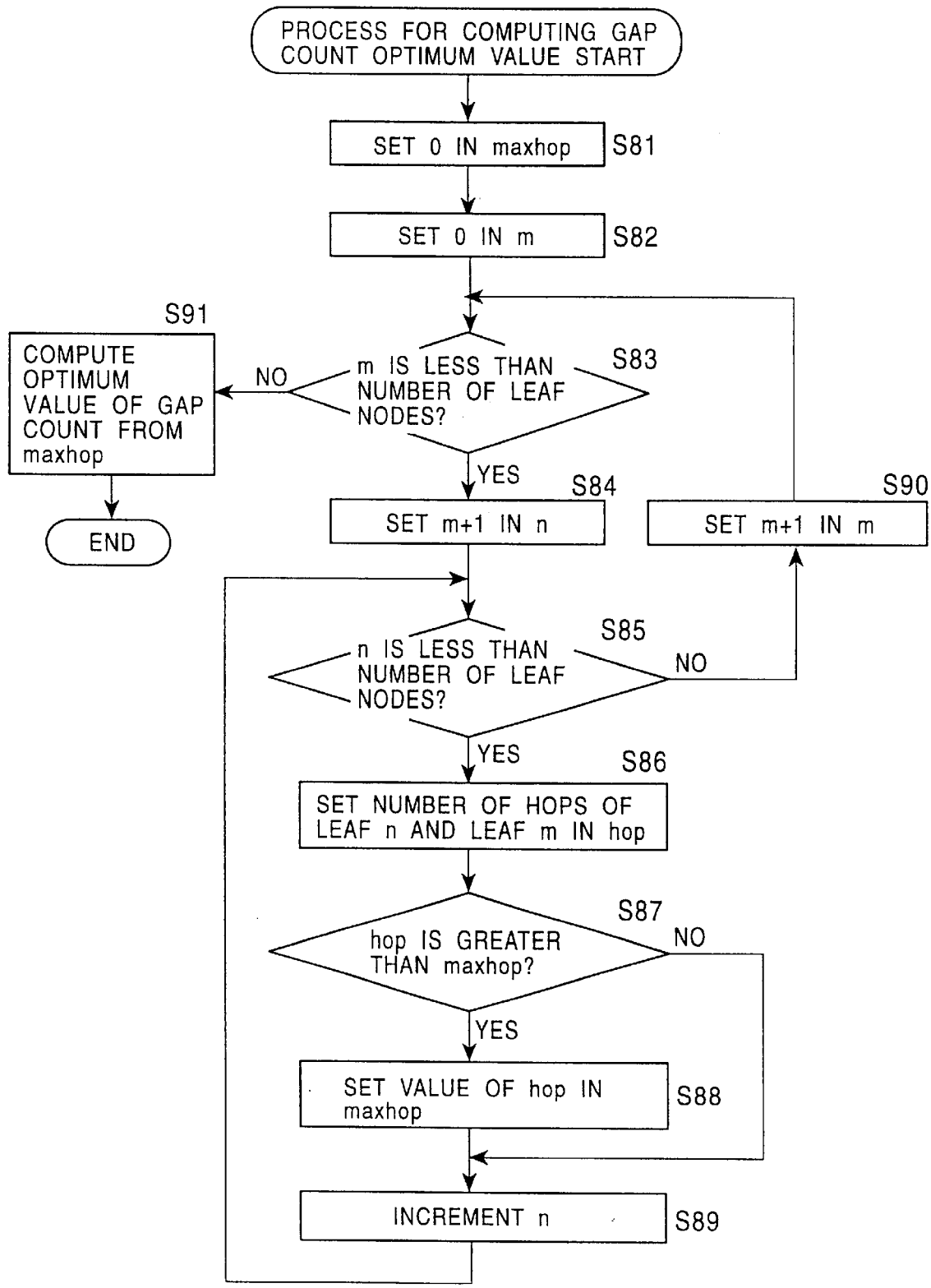
FIG. 15 is a flowchart illustrating a process for computing the optimum value of the gap count on the basis of the number of hops.

FIG. 15 is a flowchart illustrating a process for computing the optimum value of a gap count on the basis of the number of hops in step S14 of FIG. 7. This process searches and the maximum number of hops for the objects of the leaf nodes and the leaf nodes, and computes the optimum value of the gap count on the basis of the value thereof. In step S81, the bus manager sets 0, which is an initial value, in a variable maxhop. In step S82, the bus manager sets 0, which is an initial value, in a variable m. In step S83, the bus manager determines whether or not the value of m is less than the number of leaf nodes. When it is determined that the value of m is less than the number of leaf nodes, in step S84, the bus manager sets m+1 in a variable n. In step S85, the bus manager determines whether or not the value of n is less than the number of leaf nodes. When it is determined that the value of n is less than the number of leaf nodes, the process proceeds to step S86 where the number of hops between the leaf node n and the leaf node m, which has been computed in the process of FIG. 14, is set in the variable hop. In step S87, the bus manager determines whether or not the hop is greater than maxhop. When it is determined that the hop is greater than the maxhop, in step S88, the value of hop is set in the maxhop. When it is determined in step S87 that the hop is equal to or smaller than the maxhop, step S88 is skipped. In step S89, the bus manager increments n, and the process returns to step S85 and the processing is continued. When it is determined in step S85 that the value of n is equal to or greater than the number of leaf nodes, the process proceeds to step S90 where the bus manager increments m, and the process returns to step S83 and the processing is continued. When it is determined in step S83 that the value of m is equal to or greater than the number of leaf nodes, the process proceeds to step S91 where the bus manager computes the optimum value of the gap count from the value of the maxhop on the basis of the specifications of IEEE1394, and the processing is terminated. In a manner as described above, it is possible for the bus manager to compute the optimum gap count corresponding to the topology of the network and to set the optimum subaction gap and arbitration reset gap.

Figure 16:
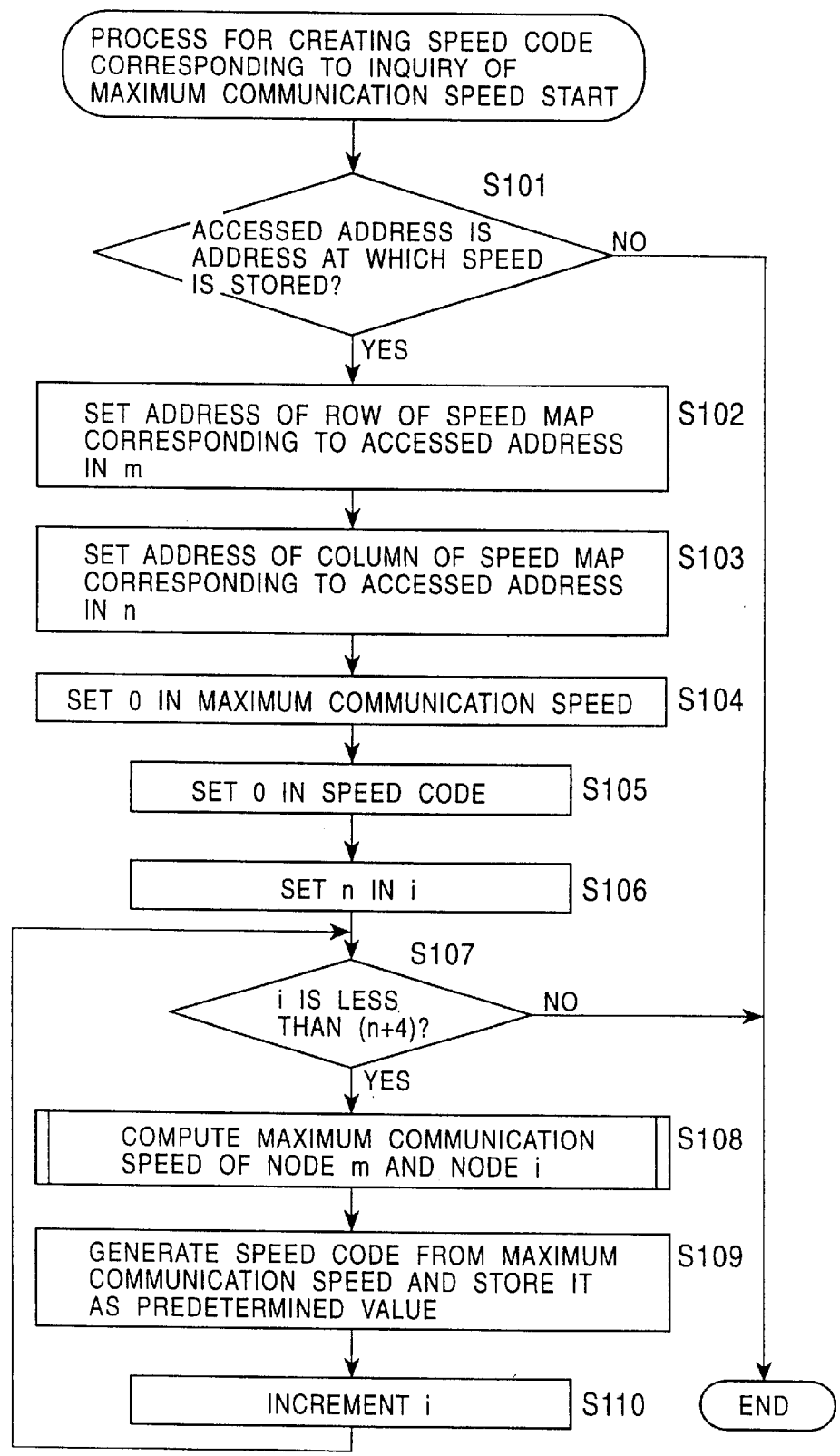
FIG. 16 is a flowchart illustrating a process for responding to an inquiry of a communication speed from another node.

It is possible for the bus manager to store the tree structure data determined in step S12 of FIG. 7, to compute a subject communication speed when there is an inquiry of the highest communication speed among the nodes from another node, and to respond to that node. At this time, the bus manager must transmit a response in units of quadlets in conformance with the specifications of IEEE1394. FIG. 16 is a flowchart illustrating a process for creating a speed code in response to an inquiry of the communication speed from another node. In step S101, the bus manager determines whether or not the accessed address is an address at which the speed code is stored. When it is determined that the accessed address is an address at which the speed code is stored, in step S102, the address of the row of the speed map of the accessed address is set in the variable m. In step S103, the address of the column of the speed map of the accessed address is set in the variable n. In step S104, the bus manager sets 0, which is an initial value, in the highest communication speed. In step S105, the bus manager sets 0, which is an initial value, in the speed code. In step S106, the bus manager sets the value of n in a variable i.

In step S107, the bus manager determines whether or not i is less than (n+4). When it is determined that i is less than (n+4), in step S108, the highest communication speed of the node m and the node i is computed. In step S109, the bus manager creates a speed code on the basis of the highest communication speed obtained in step S108 and stores it as a predetermined value. In step S110, the bus manager increments i, and the process returns to step S107 and the processing is continued. When it is determined in step S101 that the accessed address is not an address at which the speed code is stored, and when it is determined that i is equal to or greater than (n+4), the processing is terminated.

Figure 17:
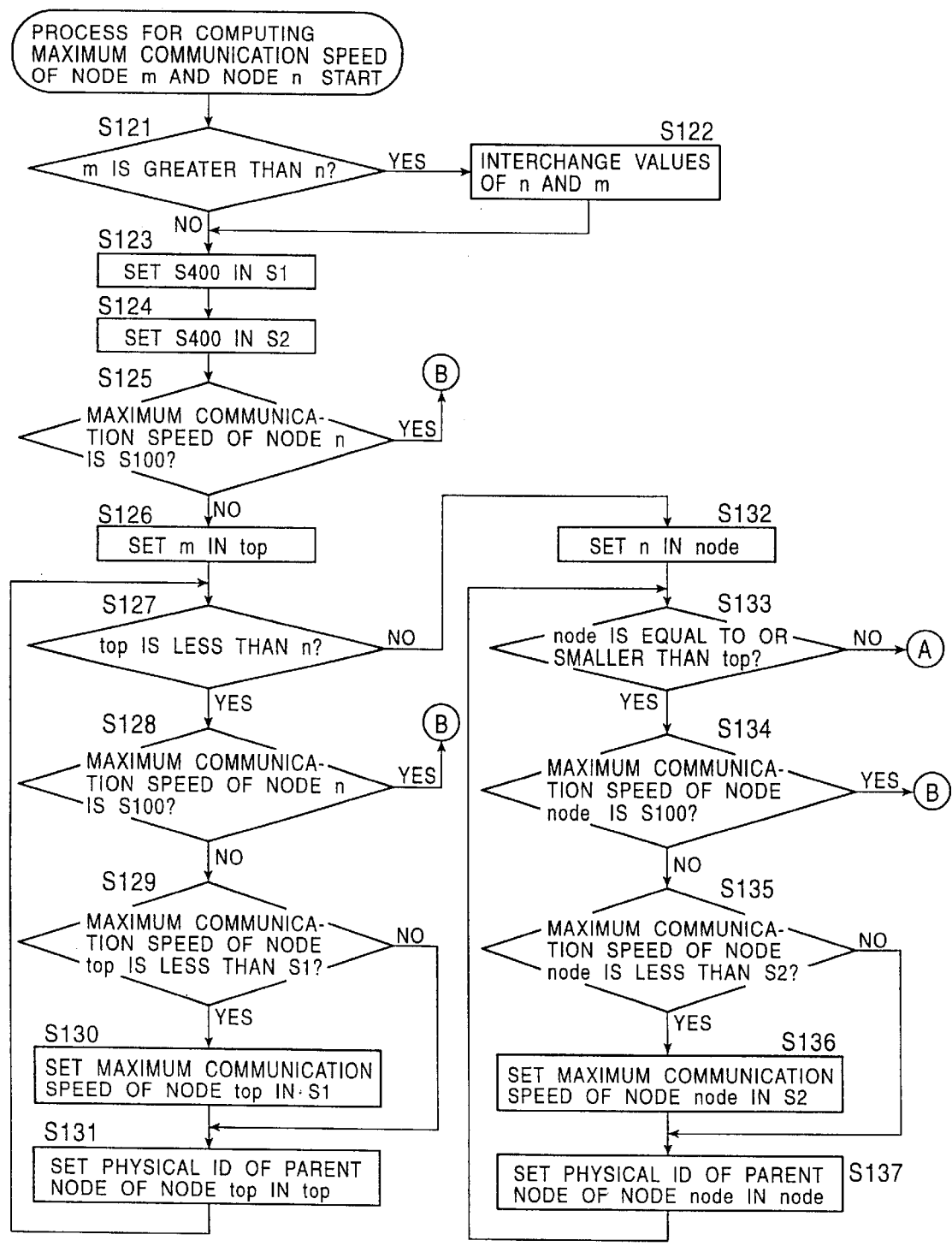
FIG. 17 is a flowchart illustrating a process for computing the highest communication speed of node m and node n.
Figure 18:
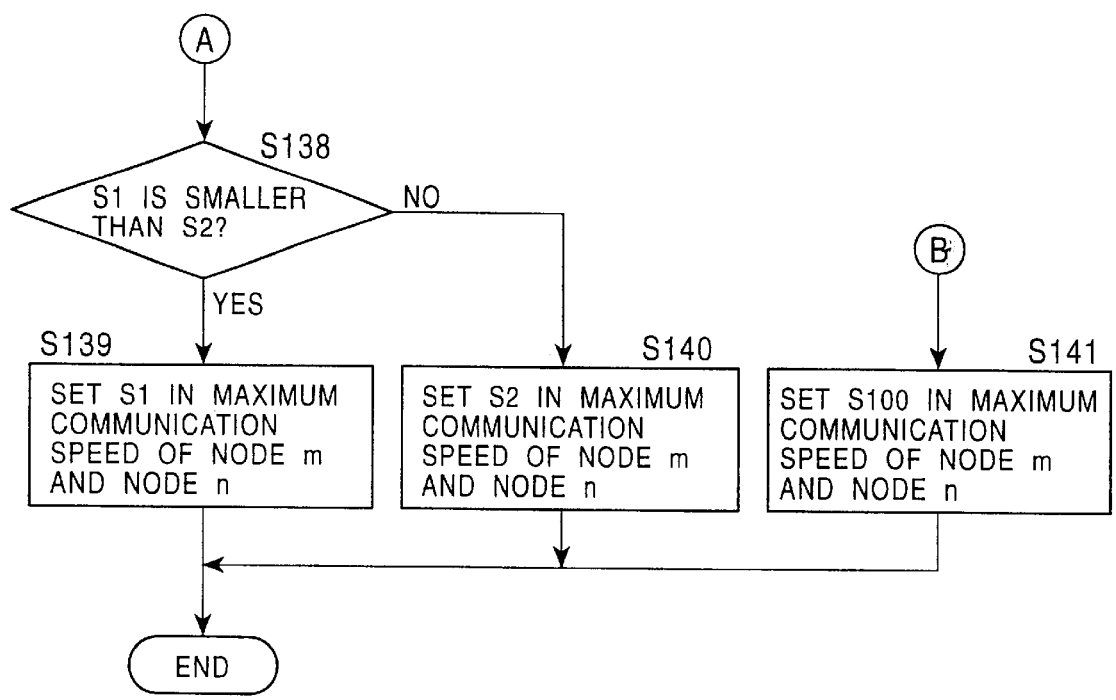
FIG. 18 is a flowchart illustrating a process for computing the highest communication speed of the node m and the node n.

FIGS. 17 and 18 are flowcharts illustrating a process for computing the highest communication speed of the node m and the node n in step S108 of FIG. 16. In step S121, the bus manager determines whether or not m is greater than n. When it is determined that m is greater than n, the process proceeds to step S122 where the values of n and m are interchanged. When it is determined in step S121 that m is equal to or smaller than n, the process proceeds to step S123. In step S123, the bus manager sets S400, which is an initial value, in a variable S1. In step S124, the bus manager sets S400, which is an initial value, in a variable S2. In step S125, the bus manager determines whether or not the highest communication speed of the node n is S100. When it is determined that the highest communication speed of the node n is not S100, the process proceeds to step S126 where the bus manager sets the value of m in a variable top. The top is a variable for storing the physical ID of the apex when a search is made from the node m toward the root.

In step S127, the bus manager determines whether or not the top is less than n. When it is determined that the top is less than n, the process proceeds to step S128. In step S128, the bus manager determines whether or not the highest communication speed of the node top is S100. When it is determined that the highest communication speed of the node top is not S100, the process proceeds to step S129. In step S129, the bus manager determines whether or not the highest communication speed of the node top is less than S1. When it is determined that the highest communication speed of the node top is less than S1, the process proceeds to step S130 where the communication speed of the node top is set in S1. When it is determined in step S129 that the highest communication speed of the node top is equal to or greater than S1, step S130 is skipped, and the process proceeds to step S131. In step S131, the bus manager sets, in top, the physical ID of the parent node of the node top, and the process returns to step S127 and the processing is continued.

When it is determined in step S127 that the top is equal to or greater than n, the process proceeds to step S132. In step S132, the bus manager sets the value of n in the variable node. The node is a variable for storing the physical ID of the apex when a search is made from the node n toward the root. In step S133, the bus manager determines whether or not the node is equal to or smaller than top. When it is determined that the node is equal to or smaller than top, the process proceeds to step S134 where a determination is made as to whether or not the communication speed of the node "node" is S100. When it is determined in step S134 that the communication speed of the node "node" is not S100, the process proceeds to step S135 where the bus manager determines whether or not the communication speed of the node "node" is less than S2. When it is determined in step S135 that the communication speed of the node "node" is less than S2, the bus manager sets in S2 the communication speed of the node "node" in step S136. When it is determined in step S135 that the communication speed of the node "node" is equal to or greater than S2, step S136 is skipped, and the process proceeds to step S137. In step S137, the bus manager sets in the node the physical ID of the parent node of node "node", and the process returns to step S133 and the processing is continued.

When it is determined in step S133 that the node is greater than top, the process proceeds to step S138 where the bus manager determines whether or not S1 is smaller than S2. When it is determined in step S138 that S1 is smaller than S2, in step S139, the bus manager sets S1 in the highest communication speed of the node m and the node n, and the processing is terminated. When it is determined in step S138 that S1 is equal to or greater than S2, in step S140, the bus manager sets S2 in the highest communication speed of the node m and node n, and the processing is terminated.

When it is determined in step S125 that the communication speed of the node n is S100, when it is determined in step S128 that the communication speed of the node top is S100, and it is determined in step S134 that the communication speed of the node "node" is S100, the process proceeds to step S141 where the bus manager sets S100 in the highest communication speed of the node m and node n, and the processing is terminated. In a manner as described above, it is possible for the bus manager to compute the highest communication speed among the nodes.

Figure 19:
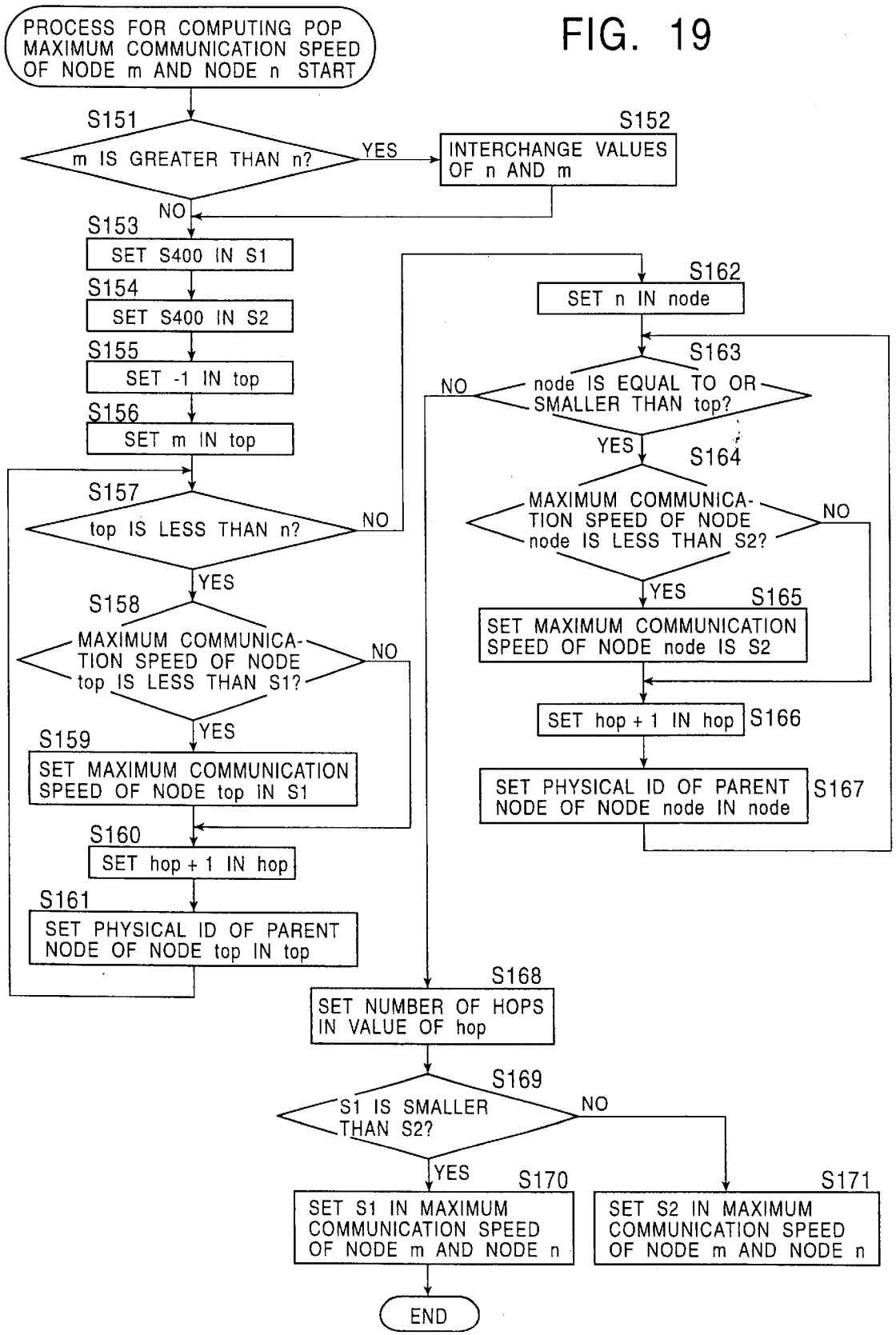
FIG. 19 is a flowchart illustrating a process for computing the highest communication speed of the node m and the node n and the number of hops between the node m and the node n at the same time.

FIG. 19 is a flowchart illustrating a process for computing the highest communication speed of the node m and node n and the number of hops between the node m and node end at the same time. In step S151, the bus manager determines whether or not m is greater than n. When it is determined that m is greater than n, the process proceeds to step S152 where the values of n and m are interchanged. When it is determined in step S151 that m is equal to or smaller than n, the process proceeds to step S153. In step S153, the bus manager sets S400, which is an initial value, in a variable S1. In step S154, the bus manager sets S400, which is an initial value, in the variable S2. In step S155, the bus manager sets −1 in the variable hop. In step S156, the bus manager sets the value of m in the variable top.

In step S157, the bus manager determines whether or not the top is less than n. When it is determined that the top is less than n, the process proceeds to step S158. In step S158, the bus manager determines whether or not the communication speed of the node top is less than S1. When it is determined that the communication speed of the node top is less than S1, the process proceeds to step S159 where the communication speed of the node top is set in S1. When it is determined in step S158 that the communication speed of the node top is equal to or greater than S1, step S159 is skipped, and the process proceeds to step S160. In step S160, the bus manager sets hop+1 in the hop. In step S161, the bus manager sets, in the top, the physical ID of the parent node of the node top, and the processing is continued.

When it is determined in step S157 that the top is equal to or greater than n, the process proceeds to step S162. In step S162, the bus manager sets the value of n in the variable node. In step S163, the bus manager determines whether or not the node is equal to or smaller than top. When it is determined that the node is equal to or smaller than top, the process proceeds to step S164. In step S164, the bus manager determines whether or not the communication speed of the node "node" is less than S2. When it is determined that the communication speed of the node "node" is less than S2, in step S165, the communication speed of the node "node" is set in S2. When it is determined in step S164 that the communication speed of the node "node" is equal to or greater than S2, step S165 is skipped, and the process proceeds to step S166. In step S166, the bus manager sets hop+1 in the hop. In step S167, the bus manager sets in the node the physical ID of the parent node of the node n, and the process returns to step S163 and the processing is continued.

When it is determined in step S163 that the node is greater than top, the process proceeds to step S168 where the bus manager sets the value of hop in the number of hops. In step S169, the bus manager determines whether or not S1 is smaller than S2. When it is determined that S1 is smaller than S2, in step S170, the bus manager sets S1 in the highest communication speed of the node m and node n, and the processing is terminated. When it is determined in step S169 that S1 is equal to or greater than S2, in step S171, the bus manager sets S2 in the highest communication speed of the node m and node n, and the processing is terminated.

Figure 20:
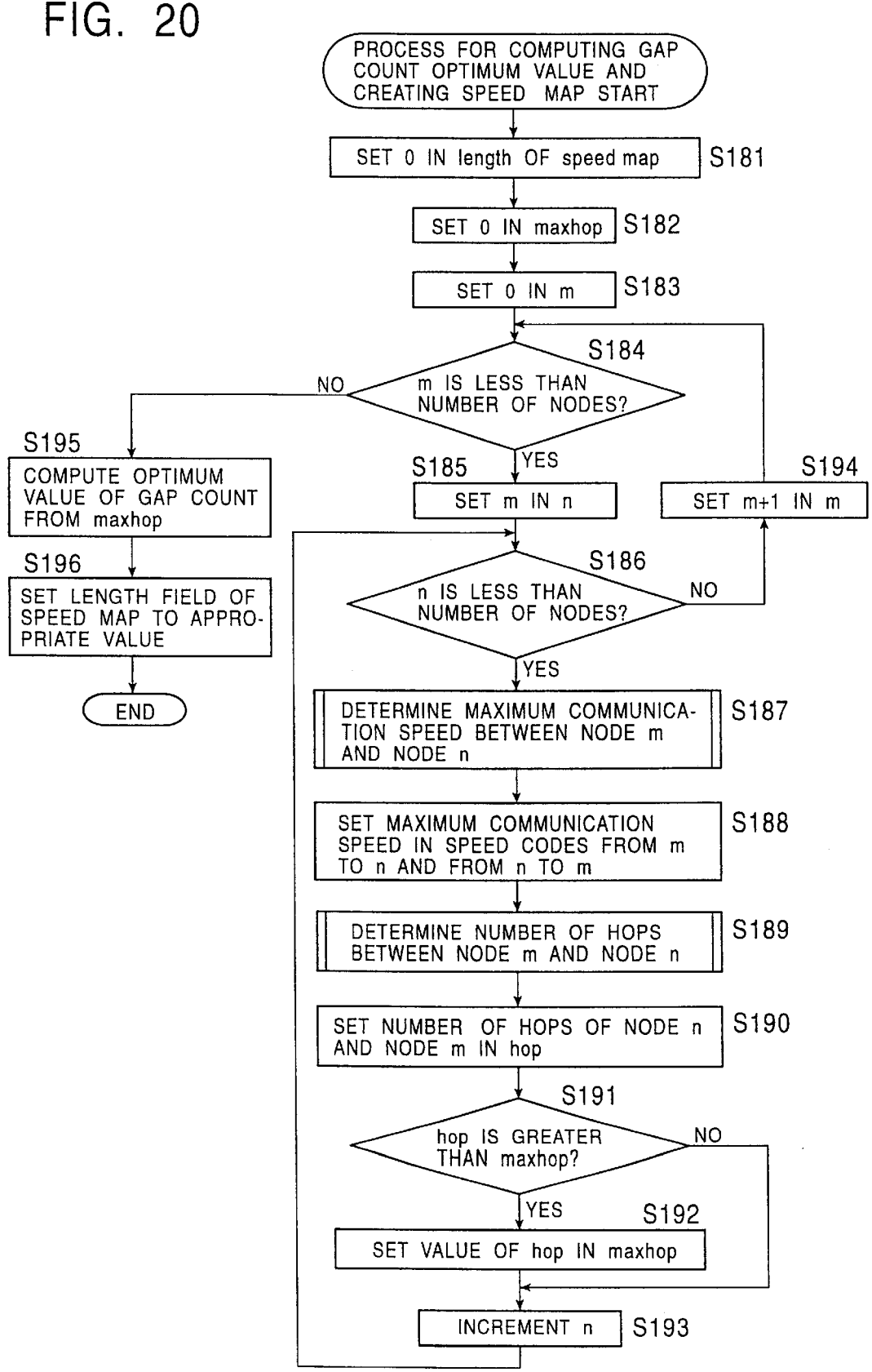
FIG. 20 is a flowchart illustrating a process for computing the optimum value of the gap count and for creating the entire speed map.

FIG. 20 is a flowchart illustrating a process for computing the optimum value of the gap count and for creating the entire speed map. In step S181, the bus manager sets 0 in the length of the speed map. In step S182, the bus manager sets 0 in the variable maxhop. In step S183, the bus manager set 0 in the variable m.

In step S184, the bus manager determines whether or not m is less than the number of nodes. When it is determined that m is less than the number of nodes, in step S185, the value of m is set in n. In step S186, the bus manager determines whether or not n is less than the number of nodes. When it is determined that n is less than the number of nodes, the process proceeds to step S187 where the highest communication speed of the node m and node n is computed. In step S188, the bus manager sets the speed code corresponding to the highest communication speed determined in step S187 in the address from the node n to the node m and in the address from the node m to the node n of the speed map. In step S189, the bus manager computes the number of hops between the node m and node n.

In step S190, the bus manager sets, in the hop, the number of hops between the leaf n and the leaf m. In step S191, the bus manager determines whether or not the hop is greater than maxhop. When it is determined that the hop is greater than maxhop, the process proceeds to step S192 where the value of hop is set in the maxhop. In step S193, the bus manager increments n, and the process returns to step S186 and the processing is continued.

When it is determined in step S186 that n is equal to or greater than the number of nodes, the process proceeds to step S194 where m is incremented, and the process returns to step S184 and the processing is continued. When it is determined in step S184 that m is equal to or greater than the number of nodes, the process proceeds to step S195 where the bus manager computes the optimum value of the gap count on the basis of the maxhop. In step S196, the bus manager sets the length field of the speed map to an appropriate value, and the processing is terminated.

In a manner as described above, it is possible for the bus manager to determine the highest communication speed between two apparatuses on the IEEE1394 serial bus, to compute the optimum gap count, and to set it in the most appropriate subaction gap and arbitration reset gap.

As distribution media for providing a computer program which performs processing such as that described above to a user, a magnetic disk, a CD-ROM, a solid-state memory, and further, communication media, such as a network or a satellite, may be used.

Having now fully described the invention, it will be apparent to one of ordinary skill in the art that many changes and modifications can be made thereto without departing from the spirit and scope of the invention as set forth herein.

What is claimed is:

1. An information processing apparatus having physical identification information and port status information connected to a network with a plurality of other information processing apparatuses each connected to said network and each having physical identification information and port status information, said information processing apparatus, comprising:

receiving means for receiving said physical identification information for identifying each of said information processing apparatuses on said network, data rate information indicating highest speed of each of said information processing apparatuses on said network and said port status information from said plurality of other information processing apparatuses along with said information processing apparatus;

creating means for creating network topology information composed of at least said data rate information and said port status information received from said plurality of other information processing apparatuses by said receiving means;

counting means for counting a number of hops between all of said information processing apparatuses on said network based upon said topology information; and determining means for determining, in a data stream, when transferring between two of said information processing apparatuses an optimum value of gap count corresponding to a particular desired transmission path on the basis of a maximum number of hops among nodes through which said data stream must be sent wherein the number of required hops and the highest communication speed between at least two nodes is simultaneously computed and used to determine a desired transmission path.

2. An information processing apparatus according to claim 1, said information processing apparatus further comprising:

second counting means for counting a number of connections between all of said information processing apparatuses on said network based upon said network structure; and controlling means for controlling communication timing of said information apparatuses on said network based upon said number of said connections.

3. An information processing apparatus according to claim 1, wherein said network is a bus interface.

4. An information processing apparatus according to claim 1, wherein said information processing apparatus is an Audio/Visual apparatus.

5. An information processing apparatus according to claim 1, said information processing apparatus further comprising:
topology map obtaining means for obtaining a topology map of said network based upon said physical identification information of each of said information processing apparatuses.

6. An information processing apparatus according to claim 5, said information processing apparatus further comprising:
topology map storing means for storing said topology map obtained by said topology map obtaining means.

7. An information processing apparatus according to claim 2, said controlling means further comprising:
storing means for storing particular timings corresponding to number of said connections; and
said controlling means controls said communication timing with a use of said stored particular timings.

8. An information processing apparatus according to claim 6, wherein said receiving means obtains self IDs defined in IEEE1394-1995 standard as said physical identification information, which are outputted from each of said information processing apparatus on said network when a reset of said network occurs; and
said topology map obtaining means obtains a topology map defined in IEEE1394-1995 standard; and
said topology map obtaining means further comprises:
writing means for writing data to a length field of said topology map defined in IEEE1394-1995 standard,
storing means for storing said self IDs;
counting means for counting a generation number, a number of nodes, and a number of self IDs; and
cyclic redundancy check setting means for setting a cyclic redundancy check for said topology map defined in IEEE1394-1995 standard.

9. An information processing apparatus according to claim 1, said information processing apparatus further comprising:
speed map obtaining means for obtaining a speed map of said network based upon said physical identification information of each of said information processing apparatuses; and
communicating means for communicating data at a speed based on said speed map.

10. An information processing apparatus according to claim 9, said information processing apparatus further comprising:
speed map storing means for storing a speed map obtained by said speed map obtaining means.

11. An information processing apparatus according to claim 1, wherein said receiving means obtains self IDs defined in IEEE1394-1995 standard as said physical identification information which are outputted from each of said information processing apparatuses on said network when a reset of said network occurs; and
said speed map obtaining means obtains a speed map defined in IEEE1394-1995 standard; and said speed map obtaining means further comprises:
writing means for writing data to a length field of said speed map defined in IEEE1394-1995 standard;
storing means for storing said self IDs;
counting means for counting a generation number, a number of nodes, and a number of self IDs; and
cyclic redundancy check setting means for setting a cyclic redundancy check for said speed map defined in IEEE1394-1995 standard.

12. An information processing apparatus according to claim 1, wherein data is transmitted in a form of a packet; and
said controlling means controls said communication timing by controlling an interval of said packets.

13. An information processing method for an information processing apparatus having physical identification information and port status information connected to a network with a plurality of other information processing apparatuses each connected to said network and each having physical identification information and port status information, said method comprising the steps of:
receiving said physical identification information for identifying all each of said information processing apparatuses on said network, data rate information indicating highest speed of each of said information processing apparatuses on said network and said port status information from said plurality of other information processing apparatuses along with said information processing apparatus;
creating means for creating network topology information composed of at least said data rate information and said port status information received from said plurality of other information processing apparatuses by said receiving means;
counting means for counting a number of hops between all of said information processing apparatuses on said network based upon said topology information; and
determining means for determining, in a data stream, when transferring between two of said information processing apparatuses an optimum value of gap count corresponding to a particular desired transmission path on the basis of a maximum number of hops among nodes through which said data stream must be sent wherein the number of required hops and the highest communication speed between at least two nodes may be simultaneously computed and used to determine a desired transmission path.

14. The information processing method for an information processing apparatus according to claim 13, said method further comprising the steps of:
second counting a number of connections between all of said information processing apparatuses on said network based upon said network structure; and
controlling communication timing of all of said information apparatuses on said network based upon said number of said connections.

15. The information processing method for an information processing apparatus according to claim 13, wherein said network is a bus interface.

16. The information processing method for an information processing apparatus according to claim 13, wherein said information processing apparatus is an Audio/Visual apparatus.

17. The information processing method for an information processing apparatus according to claim 13, said method further comprising the step of:

obtaining a topology map of said network based upon said physical identification information of each of said information processing apparatuses.

18. The information processing method for an information processing apparatus according to claim 17, said method further comprising the step of:

storing said topology map obtained at the step of obtaining said topology map.

19. The information processing method for an information processing apparatus according to claim 14, wherein said step of controlling a communication timing further comprises the step of storing particular timings corresponding to said number of said connections; and said step of controlling a communication timing controls said communication timing with a use of said particular timings stored at the step of said storing particular timings.

20. The information processing method for an information processing apparatus according to claim 18, wherein said step of receiving physical identification information obtains self IDs defined in IEEE1394-1995 standard as said physical identification information, which are outputted from each of said information processing apparatuses on said network when a reset of said network occurs; and said step of obtaining said topology map obtains a topology map defined in IEEE1394-1995 standard; and said step of obtaining said topology map obtains further comprises the steps of:
writing data to a length field of said topology map defined in IEEE1394-1995 standard;
storing said self IDs;
counting a generation number, a number of nodes, and a number of self IDs; and
setting a cyclic redundancy check for said topology map defined in IEEE1394-1995 standard.

21. The information processing method for an information processing apparatus according to claim 13, said method further comprising the step of:

obtaining a speed map of said network based upon said physical identification information of each of said information processing apparatuses; and communicating data at a speed based upon said speed map.

22. The information processing method for an information processing apparatus according to claim 21, said method further comprising the step of:

storing said obtained speed map.

23. The information processing method for an information processing apparatus according to claim 22, wherein said step of receiving physical identification information obtains self IDs defined in IEEE1394-1995 standard as said physical identification information, which are outputted from each of said information processing apparatuses on said network when a reset of said network occurs; and said step of obtaining a speed map obtains a speed map defined in IEEE1394-1995 standard; and said step of obtaining a speed map obtains a speed map defined in IEEE1394-1995 standard; and said step of obtaining a speed map further comprises the steps of:
writing data to a length field of said speed map defined in IEEE1394-1995 standard,
storing said self IDs;
counting a generation number, a number of nodes, and a number of self IDs; and
setting a cyclic redundancy check for said speed map defined in IEEE1394-1995 standard.

24. The information processing method for an information processing apparatus according to claim 13, wherein data is transmitted in a form of a packet, said step of controlling controls said communication timing by controlling an interval of said packets.

* * * * *